Figure 1:
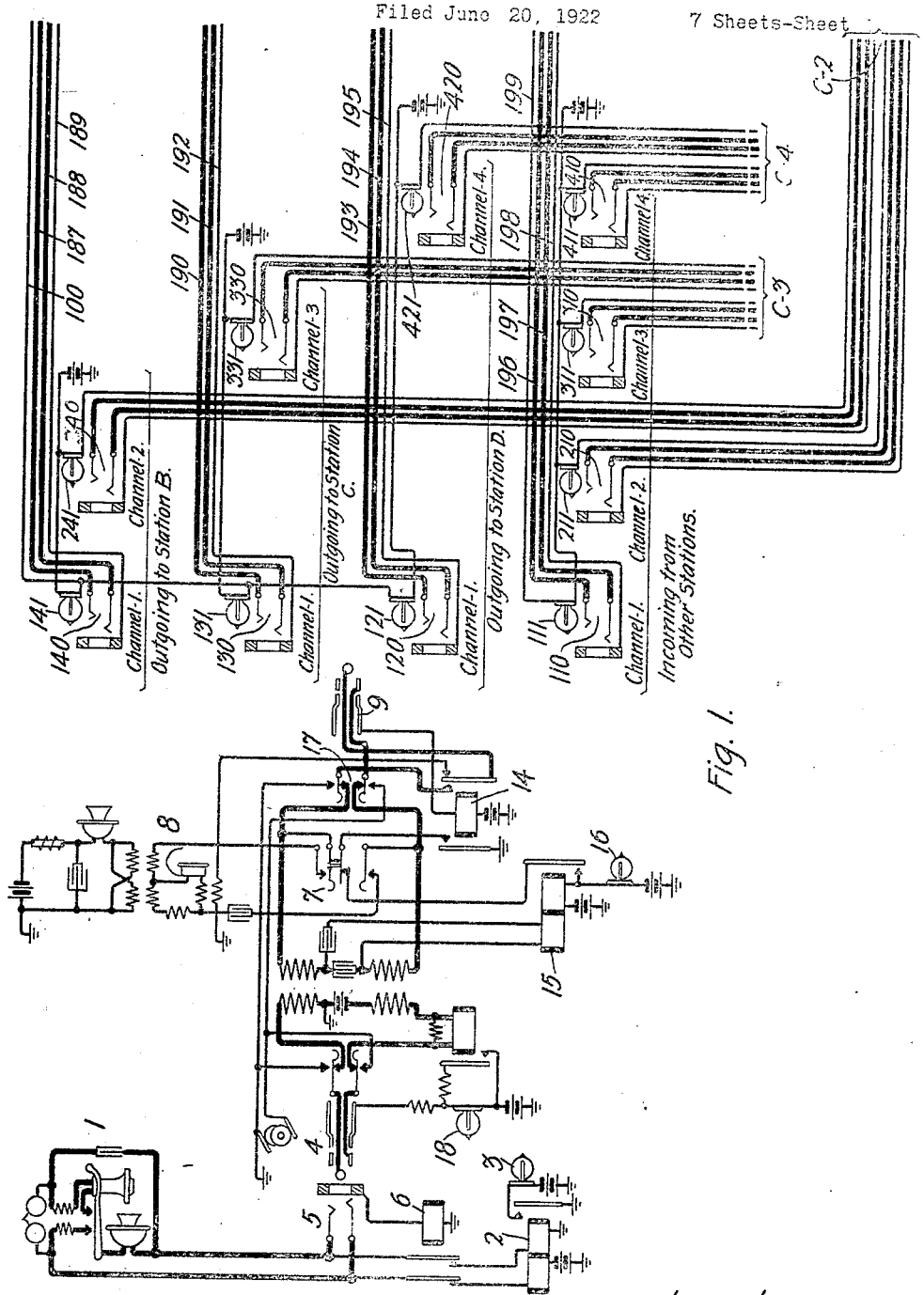

Feb. 23, 1926.

S. B. WILLIAMS, JR
CARRIER WAVE COMMUNICATING SYSTEM
Filed June 20, 1922    7 Sheets-Sheet Inventor:
Samuel B. Williams Jr.
by  E. V. Griggs
Att'y.

Feb. 23, 1926.  
S. B. WILLIAMS, JR  
1,573,959  
CARRIER WAVE COMMUNICATING SYSTEM  
Filed June 20, 1922  
7 Sheets-Sheet 4

Fig. 4.

Inventor:  
Samuel B. Williams Jr.  
by  E. V. Griggs  
Att'y

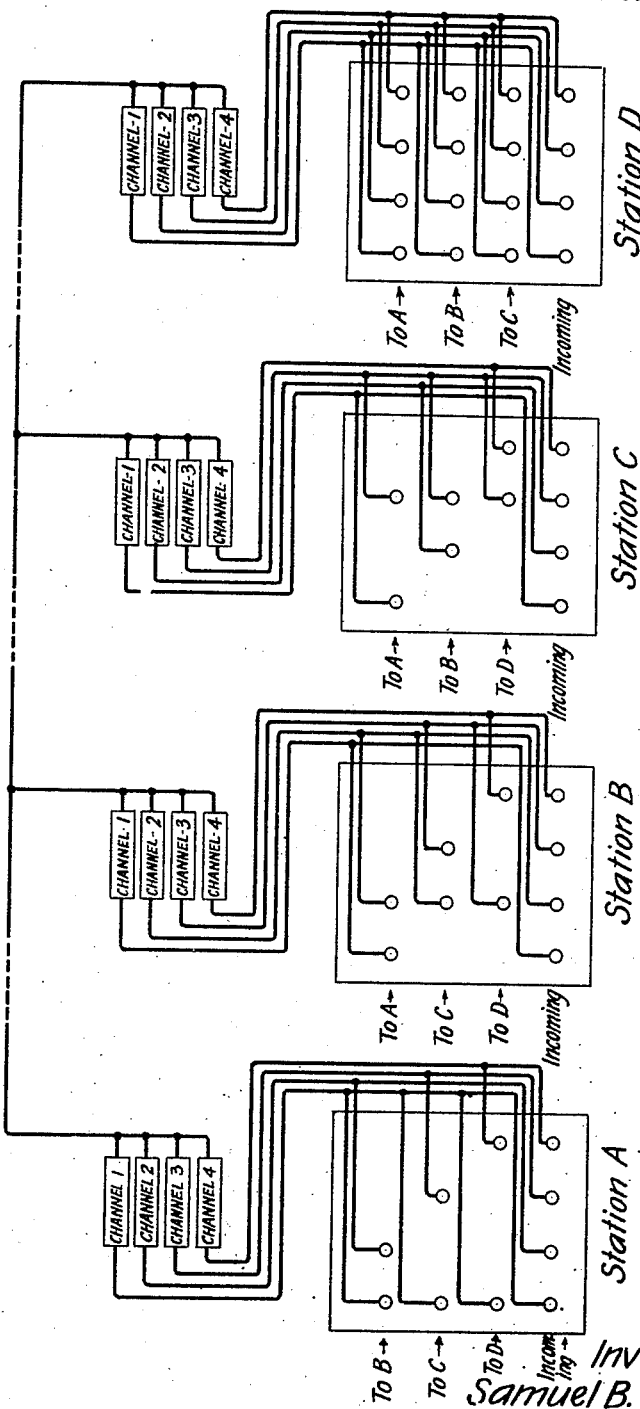

Patented Feb. 23, 1926.

1,573,959

UNITED STATES PATENT OFFICE.

SAMUEL B. WILLIAMS, JR., OF BROOKLYN, NEW YORK, ASSIGNOR TO WESTERN ELECTRIC COMPANY, INCORPORATED, OF NEW YORK, N. Y., A CORPORATION OF NEW YORK.

CARRIER-WAVE COMMUNICATING SYSTEM.

Application filed June 20, 1922. Serial No. 569,584.

*To all whom it may concern:*

Be it known that I, SAMUEL B. WILLIAMS, Jr., a citizen of the United States, residing at Brooklyn, in the county of Kings, State of New York, have invented certain new and useful Improvements in Carrier-Wave Communicating Systems, of which the following is a full, clear, concise, and exact description.

This invention relates to an improved communicating system, and more particularly to a communicating system of the type in which carrier waves or oscillations, either free or guided, are employed as the medium for conveying energy for effecting the operation and control of electric signaling, controlling and communicating apparatus located at separated points in the system. The invention especially relates to a system in which carrier currents, in the form of high frequency waves guided upon wires, are used as the medium of electrical connection between the electrical devices and apparatuses located at different points in the system. These carrier currents are assigned such frequencies that they are non-interfering with one another, so that each carrier wave serves as a connecting medium separate and distinct from the other carriers superposed upon the line or conductor over which the carriers are transmitted. Each of the carrier waves is modulated in accordance with the voice currents or other signaling or controlling currents that are to be carried. The carriers thus modulated are transmitted over the toll or long distance line and are passed through individual receiving arrangements each of which is selective of one carrier frequency to the exclusion of the others, and each of which serves to reproduce from the modulated carrier wave the voice or signal currents with which the carrier wave was modulated at the distant station.

The apparatus which is used to transmit and receive by means of any one high frequency wave is commonly known as a high frequency channel or frequency selective channel.

In the carrier communicating system to which the present invention particularly relates, a toll line or long distance line having associated with it a number of toll stations is provided at each station with such high frequency channel terminal apparatus as is necessary to give each station access for calling and communicating purposes to as many of the high frequency channels thus superposed upon the toll line as may be assigned for the use of each particular station. Each station is provided with means whereby it may selectively call any of the other stations and may establish conversational connection with the called station through the medium of any one of the high frequency channels that is at the time available for use between the calling and called stations.

Among the objects of the present invention is to organize a high frequency carrier system of this type which shall afford to each station of the toll line such facilities for communicating with each other station as the traffic conditions between the stations may require; to provide an organization in which the condition of use or disuse of the channels is constantly indicated by audible as well as visible signals to the operators at all of the toll stations that have access to each particular channel; in which access to any channel that is in use is positively prevented at all terminals excepting those terminals through which the connection over the channel is to be extended; in which simultaneous connection with any channel by way of two or more of the plurality of connection terminals with which the channel is provided at each station is automatically prevented; in which each channel is provided at each station with as many outgoing connection terminals as there are distant stations that are accessible by way of that channel; in which the selective signaling of the desired distant station is effected by the mere act of making connection with the connection terminal corresponding with the desired distant station; in which the selective signaling of the desired distant station and the guarding against access by all associated channel terminals excepting the answering terminal at the distant station are accomplished through the medium of modulating frequencies preferably within the voice frequency range, applied to the carrier frequency of the communicating channel that is used; in which the apparatus responsive to the station selecting modulations is made unresponsive or ineffective during the moduquencies; in which the apparatus for producing the station selecting modulating frequencies is common to each station and is automatically brought into temporary association with the particular communicating channel over which a call for another station is originated; and in which means are provided for preventing the station selecting modulating frequency from being associated with more than one of the communicating channels at a time.

The foregoing and other features are disclosed as co-operating in one and the same system in the present embodiment of the invention; but they are capable of separate use where it may be desirable for any reason to employ only part of the features that are presented herein. In addition the system of the invention in the preferred form in which it is herein disclosed embodies other features that have not been particularly referred to in the foregoing general statement. The various features of the invention and the manner in which they are realized will be explained in the following description, and the structures and combinations through which the objects of the invention are attained will be more particularly defined in the appended claims.

The preferred embodiment of the invention is illustrated in the acompanying drawings, in which Figs. 1 to 6, inclusive, arranged as indicated in Fig. 8, show diagrammatically as much of the circuit organization at one toll station of the system as is necessary to enable the invention to be understood; and in which Fig. 7 is a diagram showing schematically a terminal arrangement which may be employed in connection with a four channel toll line interconnecting four stations. Station A of Fig. 7 may be assumed to be the station the circuit organization of which is shown in detail in Figs. 1 to 6, inclusive; and it will be understood that in all substantial respects the wiring of the other three stations of the toll line of Fig. 7 is the same as that of station A, excepting for such modifications as are indicated by the different arrangement of the connection terminals at the various stations, and excepting for certain differences, which will be fully explained hereinafter, with respect to the location of a harmonic producer at one of the stations and a harmonic reproducer at each of the other stations.

Referring first to Fig. 7, this illustrates schematically a toll line, which may be understood to be of the ordinary metallic circuit type, over which interconnection may be had between the four toll stations A, B, C and D. Each of the four stations is connected with the toll line through the medium of four groups of apparatus respectively selective of the four high frequency or carrier waves that are used for non-interfering communication between the stations. These groups of apparatus are designated channel 1, channel 2, channel 3 and channel 4. From each channel there is connection at each of the four stations with a terminal for calls incoming to that station over that channel. The lower row of four circles at each station designated "Incoming" designate the four incoming or answering terminals of the four channels. Above the incoming terminals at each station are three rows of circles indicating the terminals for outgoing connections over the various channels from each station to each other station. Thus at station A there is provision for outgoing calls to station B over channels 1 and 2, to station C over channels 1 and 3, and to station D over channels 1 and 4. At station B there is provision for outgoing calls to station A over channels 1 and 2, to station C over channels 2 and 3, and to station D over channels 2 and 4. At station C there is provision for outgoing calls to station A over channels 1 and 3, to station B over channels 2 and 3, and to station D over channels 3 and 4. At station D there is provision for outgoing calls to each of the other stations A, B and C over all four channels. Thus the use of the channels between the varous stations is limited or restricted in accordance with the expected traffic between the stations. Of course, the provision or omission of terminals for the various channels at the different stations may be in any way desired to accommodate the conditions of traffic between the stations, the arrangement shown in Fig. 7 being merely exemplary. The apparatus that is schematically indicated in Fig. 7 by the various symbols will be particularly identified in connection with the description of the detail circuit drawings that follow.

Referring now to the preferred circuit organization as illustrated in Figs. 1 to 6 of the drawing, only as much of the wiring at a single one of the stations of the toll line (in the present case, station A) is illustrated as is necessary to enable the invention to be understood; it being possible for one skilled in the art to which this invention pertains, by mere adaptation, duplication and extension of the wiring and apparatus illustrated, and without the exercise of invention, to organize a system of such capacity with respect to number of stations and provision or limitation of service, as may be desired. As illustrated in the circuit diagram of Figs. 1 to 6, each one of the toll stations or toll points is connected with the toll line L through the medium of a two-way repeating or hybrid coil 80, this coil having one end of its line windings connected with the toll line and the other end connected with an artificial line or balancing network N that is constructed and arranged, as is well understood in the art, to balance and match in its characteristics the toll line with which connection is made. Extending from the bridge and series windings of the hybrid coil are two pairs of conductors, T and R, the pair T serving as the transmitting path to the toll line of the locally generated currents, and the pair R serving as the receiving path from the toll line of the currents generated at and transmitted from the other stations of the line. The transmitting and receiving paths each have connection with the local apparatus of the four communicating channels C—1, C—2, C—3 and C—4. At each of the toll stations there is also a connection of either the transmitting path T or the receiving path R with the base frequency channel BC. The connection of the transmitting path T is with the transmitting branches TBC, TC—1, TC—2, TC—3 and TC—4 of the various channels respectively; and the connection of the receiving path R at each station is with the receiving branches RBC, RC—1, RC—2, RC—3 and RC—4 of the various channels respectively. The transmitting branch apparatus of the base frequency channel BC is provided at only one of the toll stations. At the other three stations the transmitting branch apparatus of this channel is omitted and the apparatus indicated in connection with the receiving branch RBC is provided in its stead. At the station where the transmitting branch apparatus of the base frequency channel BC is provided, the circuit is closed at the points X and is opened at the points X'. At the other stations where the receiving branch apparatus of the base frequency channel is used, the circuits are closed at the points X' and are opened at the points X. The specific organization of the transmitting and receiving branches of the various channels will be described hereinafter. As a general description of the organization, it may be said that the transmitting branch of the base frequency channel BC is so organized as to distort in the harmonic producer HPH a base frequency generated in the oscillator OPH. The base frequency and its harmonics are conducted to a distributing circuit comprising conductors 47, 48, from which the base frequency is separated out and applied to the transmitting path T by way of the branch TBC while the harmonics are selectively passed to the transmitting apparatus of the communicating channels C—1, C—2, C—3 and C—4 to supply the carrier frequencies for conveying the speech and signaling modulations over the respective channels.

The apparatus in the receiving branch RBC of the base frequency channel BC is so organized that the base frequency received from the particular one of the four toll stations where the base frequency producing apparatus is located, is separated out from the other carrier frequencies passing over the receiving path R, is amplified, passed through a harmonic reproducer HRP, and the harmonics of the base frequency thus produced are supplied to the distributing conductors 47, 48 to supply the carrier frequencies required by the communicating channels C—1, C—2, C—3 and C—4 of the associated station.

The organization of each of the communicating channels C—1, C—2, C—3 and C—4 is such that the voice currents received from the local telephone circuit by way of the talking conductors 103 and 104 are passed through the hybrid coil 161, caused to modulate the amplified carrier frequency received from the distributing conductors 47, 48 and the modulated carrier frequency conducted to the transmitting path T. The organization of each of the communicating channels is also such that the characteristic carrier frequency to which the channel is adapted to respond is separated out from the other frequencies passing over the receiving path R, and the voice or signal-modulated component is conveyed by way of the hybrid coil 161 to the local talking conductors 103 and 104, or by way of the tuned circuits and rectifiers to the relays 178 and 179, depending upon the energized or inert condition of the relay 116; while the high frequency components are diverted and caused to operate the relay 19. The relays 178 and 179 act through the medium of relays 171 and 170, respectively, to effect the selection of the associated station when the carrier is modulated with the particular station-selecting frequency to which the station apparatus is responsive, and to render inoperative the station selective apparatus when it is another one of the stations that is being called. The relay 19 participates, through the medium of relay 155, in controlling the guarding and busy signaling operations incident to the use of the associated channel.

The low frequency waves that are used to modulate the communicating carrier waves for station selecting purposes are generated in an oscillator SO having a number of tuning branches, under the control of relays 20, 22, 23 and 24, for the purpose of varying the frequency of the oscillations. These oscillations amplified by means of the amplifier SA, are supplied to conductors 66, 67 from which branches, under the control of relays, as 164, extend to the transmitting branch modulator circuits of the various channels. The station selecting oscillator may be common, not only to the different channels of a single toll line shown, but may also have its current supply conductors 66, 67, extended for the common use of all of the carrier multiplex toll lines of the exchange. The channels that are served in common by the station selecting oscillator SO have access to the oscillator through the medium of an extended starter wire circuit including the conductors 60, 61 and 62 and relays 175 and 176 for each of the channels that is connected with the starter wire circuit. The relationship is such, as will subsequently be explained, that only one channel at a time is enabled to be placed in operative relation with the station selecting oscillator. It may be mentioned that there are two other common conductors 68 and 69 under the control of certain relays associated with the circuits of oscillator SO, which conductors serve the function of controlling devices associated with each channel for regulating the energy of the channel in such a way as to compensate for varying distance or energy attenuation between the stations that are to be connected.

The length of time that a calling channel has the use of the common station selecting oscillator circuit is controlled by a common timing circuit including relays 50, 51, 52, 53, 54 and 55, that are set in operation through the medium of the common starter wire circuit at the instant this circuit operates to give the particular channel that is calling the exclusive use of the common station selecting oscillator.

Each of the communicating channels C—1, C—2, C—3, and C—4 has associated with it a number of controlling and responsive elements in addition to those that have already been mentioned. These elements, which will be fully described hereinafter, are diagrammatically indicated in full with respect to channel C—1, but in the case of the other channels C—2, C—3 and C—4 the detailed showings have been omitted, and it has been deemed sufficient merely to indicate the connection which would be extended from various circuits to these channels. Each of the communicating channels has branches extending to a plurality of connection terminals located upon the toll board and adapted for use by the toll operator or operators in extending incoming and outgoing calls. Channel C—1 has four normally disconnected extensions or branches at the station shown in the detail drawings. One of these branches extends to the answering spring jack 110 with which is associated the calling lamp 111, while the other three branches extend to the outgoing spring jacks 120, 130 and 140 with each of which is associated a busy lamp 121, 131 and 141, respectively. Channel C—2 at this station has two normally disconnected branches or extensions, one of which terminates upon answering spring jack 210 with which is associated a calling lamp 211, while the other branch terminates upon outgoing spring jack 240 with which is associated the busy lamp 241. Channel C—3 has a branch extending to answering spring jack 310 with associated calling lamp 311, and a branch extending to outgoing spring jack 330 with an associated busy lamp 331. Channel C—4 has a branch extending to answering spring jack 410 with associated calling lamp 411, and a branch extending to outgoing spring jack 420 with an associated busy lamp 421. As indicated, the arrangement of the channel terminals upon the switchboard may be such that all of the outgoing connection terminals through which each particular distant station may be reached are in the same horizontal row. Thus it may be seen that this station may reach station B over channels 1 and 2, station C over channels 1 and 3 and station D over channels 1 and 4; and that the station may be reached by the other stations collectively over all of the four channels.

The different branches of each channel are associated in an extended starter wire circuit including conductors 107, 108, 117, 118, 127, 128, etc., and a pair of relays, as 122 and 123, for each of the channel branches. This extended starter wire circuit, in connection with certain associated common relays, operates to prevent the extension of the channel conductors to more than one of the channel branches at a time. If it is desired that a channel shall have additional branches extending to connection terminals located on other switchboards of the toll station, such branches may be organized in the same manner as those shown in the drawing, and the starter wire circuit may be extended to include the additional branches so that only one branch at a time may be connected with the main channel circuit.

The toll operator may be provided with the usual equipment of connecting cord circuits such as the one shown in Fig. 1; and these connecting cord circuits may be used, for effecting interconnection between the carrier channel terminals and subscribers' lines, such as the one illustrated extending to substation 1, or with other toll lines, as may be desired.

Specifically, the organization and operation of that part of the system which acts to generate, modulate, transmit, receive and demodulate the high frequency carrier currents employed in the system is as follows: The frequency of the carrier waves selectively utilized by the communicating channels is determined, in the present embodiment of the invention, by a base or control frequency generated by a thermionic or vacuum tube oscillator OPH located at one of the toll stations or at some other point upon the toll line. This oscillator may be of any suitable type but is shown as the well known audion type with a feed-back connection from its output to its input circuit. The frequency of the oscillatory current produced may be regulated by an adjustable condenser, and may conveniently be, say, five thousand oscillations per second,—although any other appropriate base frequency and its associated harmonic multiple frequencies may be employed. The oscillator OPH supplies substantially sinusoidal oscillations to the input circuit of the harmonic producer HPH. An inductance 81 is bridged across this circuit. The magnitude of the oscillations supplied is such as to overload the thermionic tube HPH; that is, to supply an input wave of greater amplitude than the tube can repeat without distortion. The repeated oscillations in the output circuit of the tube HPH are therefore of non-sinusoidal wave form, which is the equivalent of a base frequency current of sinusoidal form and a series of currents of frequencies which are multiples or harmonics of the base frequency. The plate current supply of the overloaded tube or harmonic producer HPH is through a circuit comprising a resistance 82 and an inductance 83 which constitutes an impedance of the order of magnitude of the impedance between the plate and filament of the tube or of greater magnitude. This impedance relationship assists in producing distortion and in stabilizing the output circuit. The output circuit of the harmonic producer HPH is connected with the distributing circuit 47, 48, by means of a transformer 84, and the distributing circuit is thus supplied with both the base and the harmonic frequency oscillations. From the distributing circuit 47, 48, the base and harmonic frequencies are selected by means of tuned circuits leading to the transmitting branches of the various communicating channels and the transmitting branch of the base frequency channel. The inductance of the transformer 85 of the base frequency transmitting branch and the capacities of the fixed and variable condensers associated with it are so adjusted that only the base frequency oscillations are selected. Similarly the constants of the transformers and condensers of the other tuned circuits leading from the distributing circuit are so adjusted that each of these tuned circuits selects a different one of the harmonics of the base frequency. The harmonic frequencies selected by the transmitting branches of the communicating channels C—1, C—2, C—3 and C—4 may be ten thousand, fifteen thousand, twenty thousand, and twenty-five thousand cycles, respectively.

The base frequency oscillation selected from the distributing circuit by the tuned circuit including the transformer 85 passes through a potentiometer 86, from which it is supplied at the desired potential to the input circuit of the amplifier HA. The output circuit of the amplifier HA is inductively coupled with the terminals of a band filter HF through which the amplified base frequency oscillation passes to the transmitting path T. The band filter HF is of the well-known type described in Patent No. 1,227,113 to Campbell, patented May 22, 1917. The characteristics of this filter, which consists of recurrent similar sections having series and shunt capacities and inductances, is such that it transmits oscillations of the base frequency with little attenuation, and effectively diverts from this branch currents of frequencies differing more than a slight amount from the frequency for which it is adjusted.

As has been stated, the base frequency oscillator is provided at but one station or point on the toll line. At the other toll stations or points the base or controlling frequency thus supplied to the line passes through the two-way repeating coil 80 of the station into the receiving path R. The receiving branch RBC of the base frequency channel is provided with a transformer 87 with associated capacities and inductances to constitute a tuned circuit that acts to divert the base frequency oscillation from the receiving path to the amplifier HRA—1 by way of the potentiometer 88, while permitting the free passage of the other carrier frequencies through the receiving path to their respective channels. The base frequency thus selected is amplified by the amplifier HRA—1, and the amplifier oscillations are impressed upon the input circuit of the thermionic tube HRP. The magnitude of the oscillations is such as to overload this tube, with the result that, as in the case of the tube HPH associated with the base frequency oscillator OPH, the repeated oscillations are distorted into a series of currents the frequencies of which are the harmonics of the base frequency current, the tube HRP thus acting as a harmonic regenerator. The base frequency and its harmonics are then amplified by the amplifier HRA—2 and are impressed upon the distributing circuit 47, 48 through the transformer 89. From the distributing circuit the harmonic frequencies of the base or controlling oscillation are selectively supplied to the transmitting branches of the channels C—1, C—2, C—3 and C—4 by way of the tuned circuits previously referred to. Thus at the toll station where the base frequency oscillator OPH and the harmonic producer HPH are located the communicating channel carrier frequencies are supplied directly, while at the other stations they are supplied by a harmonic regenerator HRP controlled by the base frequency oscillations received over the toll line. Consequently the corresponding carrier frequency oscillations are identical in frequency at all of the stations of the toll line.

The organization illustrated and described for producing a plurality of harmonic carrier frequencies from a base frequency by distorting that frequency, and for insuring identical frequencies of the carrier oscillations employed at each of the various toll stations by controlling the carrier frequencies at all points from a single base frequency is substantially in accordance with the organization disclosed in the British Patent 131,426. The method and organization described above for synchronizing corresponding carrier waves at all stations is the preferred way of securing this result for use in connection with the present embodiment of the invention. But it will be understood that other ways of securing substantially identical frequencies of the carrier waves at the different points at which they are applied may be used.

At each of the communicating channels C—1, C—2, C—3 and C—4 the particular carrier frequency diverted from the distributing circuit 47, 48 by means of the corresponding tuned circuit is applied to the terminals of a potentiometer 90 from which the carrier oscillations at the desired potential are applied to the input circuit of an amplifier HAC—1. The output circuit of the amplifier is connected by way of the potentiometer 91 with the input circuit of a modulator MC—1. The input circuit of the modulator MC—1 also has connection by way of the inductive coupling 92 and contacts of relay 164 alternatively with the potentiometer 158 and the potentiometer 162. The potentiometer 158 is connected by way of conductors 114 and 115 with the series winding of the low frequency hybrid coil 161 that links the carrier channel with the low frequency or talking circuit. The talking conductors 103 and 104 extending by way of the various branches to the spring jack terminals of the associated communicating channel are connected through condensers with one side of the line winding of the low frequency hybrid coil, and the other side of the line windings of this coil is connected through condensers with a balancing network N, the characteristics of which are made to match the characteristics of the low frequency lines adapted to be connected with the channel. The voice currents that reach the low frequency hybrid 161 by way of the conductors 103 and 104 are consequently repeated and impressed at the proper potential upon the input circuit of the modulator MC—1 and are there combined with the carrier frequency derived from the distributing circuit 47, 48 to cause correspondingly modulated carrier current to flow in the output circuit of the modulator. A modulator of this general type is disclosed in United States patent to Van der Bijl, No. 1,350,752, issued August 24, 1920.

The other potentiometer 162, which is connected through the inductive coupling 92 with modulator MC—1 when relay 164 is operated, has connection by way of the common supply leads 66, 67 with the group of apparatus (Fig. 5) which supplies the low frequency station selecting waves for modulating the communicating carriers of the various channels. This apparatus includes an oscillator SO of the usual audion type with a feed back connection from its output into its input circuit. The frequency of the oscillatory current produced is regulated by a plurality of tuning branches each of which includes a condenser 30, 32, 33 and 34, respectively, and each of which also includes the normally open contacts of relays 20, 22, 23 and 24, respectively. The electrical characteristics of these various tuning branches are such that each branch when it is closed causes the oscillator SO to deliver an oscillatory current differing in frequency from the frequency of the current produced when any of the other branches is closed, these frequencies preferably being assigned such values as to be relatively low and within the voice frequency range. The arrangement is such that when the relay 20 is operated to close the tuning branch including condenser 30 it opens the energizing circuits of the other associated relays 22, 23 and 24 so that any of the latter relays which may have been operated to close its associated tuning branch is deenergized to cause the opening of that branch. Two of the relays, namely, 23 and 24, also are arranged so as to control one or both of the artificial line sections included in the transmitting and receiving branches of the channel with which this group of apparatus is at the time associated, as will subsequently be described. The plate and filament current for the energization of the oscillator SO and associated amplifier SA is controlled by means of the relay 21. The amplifier SA has its input circuit connected with the output circuit of the oscillator SO, and the output circuit of the amplifier SA is connected by means of an inductive coupling with the common supply leads or conductors 66, 67. Thus the carrier wave of the channel is modulated by the low frequency voice currents by way of potentiometer 158 when relay 164 is inert, and is modulated by way of potentiometer 162 by whichever of the low frequency station selecting oscillatory currents is being supplied to the common supply leads 66, 67 when relay 164 is energized.

The output circuit of the modulator MC—1 of the communicating channel transmitting branch is connected by way of the inductive coupling 94 with two sections of artificial line, one of which is controlled by the relay 137 and the other by the relay 138. The series windings of each section are normally short-circuited by resting contacts of the relays 137 and 138 and the shunt windings, each of which is bridged across the circuit between mid-points of the series windings, are normally opened at front contacts of the relays 137 and 138. Consequently in the deenergized condition of relays 137 and 138 the artificial line sections are excluded from the circuits of the transmitting branch. The second of the two artificial line sections is connected with a band filter MFC—1 of the type disclosed in the Campbell patent previously referred to. One characteristic among others of this particular form of the Campbell band filter is that it suppresses any currents of the frequency of the voice currents in the talking conductors of the channel which might be repeated as low frequency currents by the modulator. Also the band filter MFC—1 of each of the channels serves to transmit currents of a different restricted range of frequencies including the carrier frequency of that channel and frequencies extending up and down from the carrier frequency by an amount depending upon the highest frequency current that it is desired to transmit from the low frequency or talking circuit.

The band filters MFC—1 of the four communicating channels and the band filter HF of the base frequency channel BC are all arranged with their terminal impedances in series in the transmitting path 43, 44; and the constants of these various filters are so adjusted that each filter passes freely to the transmitting path the carrier and modulation frequencies from its own channel while at the same time preventing the frequencies supplied through the filters of the other channels from being diverted into its channel. The band filters DFC—1 of the receiving branches of the various communicating channels C—1, C—2, C—3 and C—4 and the tuned circuit of the receiving branch RBC of the base frequency channel BC are similarly included in the receiving path R extending from the high frequency hybrid coil 80; and the constants of these filters and of the tuned circuit are so adjusted that each diverts from the receiving path R into its own channel the particular frequency to which the channel apparatus is adapted to be responsive, while permitting to pass freely through its termination circuit the frequencies which the other channels are adjusted to divert.

The receiving branch of each of the communicating channels is provided with a band filter DFC—1 adjusted, as stated above, to divert into the channel the characteristic frequency band of that channel. After passing through the band filter, the diverted oscillatory current passes through conductors controlled at back contacts of two relays 147 and 148. Each of these relays is adapted when operated to include in the receiving branch an associated section of artificial line, the arrangement and control of these artificial line sections being the same as that previously referred to in the description of the artificial line sections included in the transmitting branch of the circuit. The oscillatory current diverted through the band filter DFC—1 is then carried through a potentiometer 95 and applied at the proper potential to the primary side of a shielded transformer 96, the secondary side of which is included in the input circuit of the detector DC—1. The C potential for the grid of this detector tube is derived from the filament battery by including a resistance 97 in the filament current supply circuit beyond the point where the input coil of the detector is connected with the filament circuit. The output circuit of the detector DC—1 is connected to the input circuit of the amplifier AC—1 through the medium of a transformer 98 which is designed to transmit efficiently the frequencies within the voice frequency range obtained from the demodulation of the modulated carrier wave, as well as the unmodulated carrier component. The output circuit of the amplifier AC—1 is connected to the low pass filter LPC—1, designed to pass the voice and station selecting frequencies and exclude the carrier frequencies, by way of a transformer 99. The other terminals of the low pass filter are connected to the armatures of a relay 116 which in operating connects the low pass filter by way of conductors 116' and 117' with the bridge terminals of the low frequency hybrid coil 161. At this point the voice currents are divided between the talking conductors 103 and 104 and the balancing network N in such a way as to have their effects as nearly as possible neutralized in the winding of the hybrid coil that is connected with the outgoing transmission branch of the channel.

When the relay 116 is inert the low pass filter LPC—1 is connected through two tuned circuits SC—1 and CC—1 with the rectifying tubes SRC—1 and CRC—1, respectively. The output circuits of these rectifying tubes are connected with the windings of relays 178 and 179, respectively. The two tuned circuits and their associated devices are adapted to be responsive to certain of the modulating frequencies impressed upon the carrier wave by the station selecting oscillators SO (Fig. 5) located at the other stations of the system. The tuned circuit CC—1 and the asssociated rectifier tube CRC—1 and relay 179 respond to the modulating frequency produced by the oscillator SO at any of the distant stations when its tuning branch including the condenser 30 is closed. The tuned circuit SC—1 with the associated rectifier tube SRC—1 and relay 178 respond to the frequency produced by the oscillator SO at any of the distant stations when the particular one of the other tuning branches of the oscillator is closed that corresponds to this station. The constants of the tuning branches including the condensers 32, 33 and 34 at each of the stations are so selected that the closure of each one of the branches causes the associated oscillator SO to produce the frequency to which the tuned circuit SC—1 at a particular corresponding one of the distant stations is responsive, and to which the tuned circuits SC—1 of all the other stations are unresponsive. Thus, for example, the tuned circuit SC—1 of station A may be adjusted to be responsive to a frequency of 300 cycles, that of station B to a frequency of 500 cycles, that of station C to a frequency of 700 cycles and that of station D to a frequency of 1100 cycles. The tuned circuits CC—1 of all the stations may be adjusted to be responsive to the same frequency, which may, for example, be assumed to be 1300 cycles. As there is at no time any occasion for the oscillator SO of any of the stations to generate the frequency to which the tuned circuit SC—1 of that particular station is responsive, the tuning branch of the oscillator SO of each station for producing the selecting frequency of the home station may be omitted.

The output circuit of the amplifier AC—1 of the receiving branch of the channel also has a branch path through a high pass filter HPC—1 which passes only high frequency currents of the order of the carrier wave frequency and prevents the passage of the demodulated voice and selecting frequency components. The other terminals of the high pass filter HPC—1 are connected with the primary side of a transformer 79, the secondary side of which is connected in the input circuit of the rectifier tube HRC—1. The output of the rectifier contains relay 19 so adjusted as to respond and hold its contacts closed as long as the associated communicating channel is receiving the carrier frequency components which it is adapted to divert from the receiving path R.

The arrangement is such that the filament and plate energizing currents are constantly supplied to the apparatus of the receiving branch of the channel, so that all of the channels at all of the stations are normally in a responsive condition. The filament and plate currents for the energization of the transmitting branch of each channel are under the control of a relay 165, and are applied to the transmitting branch apparatus only when the relay 165 is energized.

In outline the operation of the system is as follows: Let it be assumed that the operator at station A desires to establish connection between one of the local lines terminating at station A and one of the local lines terminating at station B. She first notes the condition of busyness or idleness of the channels available for connecting with station B, as indicated by the illuminated or unilluminated condition of the busy lamps associated with the spring jacks in the row or group allotted for station B connections, and inserts the calling plug of an available pair of connecting cords into a channel spring jack the associated lamp of which is dark. In case a channel is busy and the lamp should fail to indicate its busy condition, a busy test click is given in the operator's telephone receiver as the tip of the plug touches the test thimble of the spring jack; and when the plug is fully inserted in the spring jack a busy tone is heard in the operator's telephone receiver and the connection is not extended to the channel conductors. But if the channel is in fact idle and available, the insertion of the connecting circuit plug appropriates the channel for the exclusive use of the branch leading to the spring jack in which the plug is inserted, lights the busy lamps at the calling station associated with the other outgoing branch terminal spring jacks of this channel, and applies the busy test and busy tone indications to these other spring jacks of the channel. At the same time the insertion of the connecting plug at the calling station applies the appropriate carrier wave to this channel. The application of the carrier wave causes the lighting of the busy lamps and the application of the busy test and busy tone indications to the outgoing branch terminal spring jacks associated with this channel at all of the distant stations on the line. At the same time the insertion of the connecting plug in the spring jack at the calling station brings about the temporary association with the selected channel of station selecting apparatus at the calling station, which apparatus is common to all of the channels of this toll line, and may also be common to all of the channels of all of the other carrier toll lines entering this particular station. The common station selecting apparatus is associated with the channel over which the call is being made in such a way that for the time being it is unavailable for association with any other channel of this or any other line.

As soon as the common station selecting apparatus is appropriated and connected with the channel over which the call is being extended, it automatically operates, first, to modulate the carrier wave of the channel with a particular low frequency that effects the response of selective apparatus at the particular station that is being called, and at that station only. This frequency is determined by the particular outgoing spring jack of the channel into which the connecting plug is inserted. If the connecting plug had been inserted into the spring jack of this same channel assigned for use in calling any other of the distant stations, a different modulating frequency would have been applied by the station selecting apparatus at the calling station.

After a predetermined interval, common timing apparatus associated with the station selecting apparatus causes the first or station selecting modulating frequency to be withdrawn and a different modulating frequency to be applied to the carrier wave for another short interval, to which latter frequency apparatus at all of the distant stations is responsive. The effect of the application of this second modulating frequency is to make the station selective apparatus of this channel at all stations unresponsive during the balance of the time the channel is in use, and to bring the channel into operative relation with the answering spring jack of the channel and light the associated lamp at the called station.

When the operator at the called station inserts a connecting circuit plug in the answering spring jack in response to the lighted calling lamp, the corresponding carrier wave is applied to the channel at the called station; and in response to this application of the carrier wave at the called station, apparatus at the calling station is energized to light a lamp in the calling operator's connecting circuit, thus indicating that the called station operator has answered the call. The operators then communicate with each other and complete the connections with the local lines at their respective stations.

During the continuance of the connection either operator may signal the other by pressing the appropriate ringing key in her connecting cord-circuit. This has the effect of withdrawing the carrier wave transmitted from that end of the connection, and this withdrawal of the carrier wave causes the application of ringing current to the talking conductors at the other end of the connection. It does not, however, disturb the busy test and guarding indications associated with the channel terminals at the other stations of the line, as these indications are withdrawn only by the withdrawal of the carrier at both of the connected stations. When the operator at either the calling or called station disconnects by removing the cord circuit plug from the associated spring jack, the consequent withdrawal of the carrier wave at that end signals the operator at the other end of the connection and when the other operator removes her connecting circuit plug from the corresponding channel spring jack, the busy test indications at all of the channel terminals at all of the stations are removed and the channel apparatus at all points is restored to normal.

The operation of the system will now be described in detail. When one of the local subscribers, as the subscriber at station 1, wishes to communicate with a subscriber at another one of the toll stations associated with the carrier toll line, he takes his telephone receiver from its hook, thus operating the associated line relay 2 and lighting the calling lamp 3 associated with the answering spring jack 5. The operator responds to the lighting of the lamp by inserting plug 4 of one of the pairs of connecting cords with which she is provided into spring jack 5, thus operating the cut-off relay 6 and releasing line relay 2 to extinguish calling lamp 3 in the usual way. The operator then communicates with the calling subscriber by throwing her listening key 7, thus bringing her telephone set 8 into connection with the talking strands of the cord circuit. Upon learning from the calling subscriber that he desires a connection that must be completed over the carrier toll line to a particular one of the distant stations associated with the line, the operator observes the condition of busyness or idleness of the channels which are available for communication with the wanted station, as indicated by the illuminated or unilluminated condition of the busy lamps associated with the channel spring jack terminals that are provided for completing connection with the particular station that is being called. If the call is for station B, the operator may complete the connection either by way of spring jack 140 of channel 1 or spring jack 240 of channel 2, providing the busy lamps 141 and 241 associated with either or both of these spring jacks is unilluminated. If the call is for station C, the operator may complete the connection by way of spring jack 130 associated with channel 1 or by way of spring jack 330 associated with channel 3, depending upon the availability of one or the other of the channels as indicated by the associated busy lamps 131 and 331; and if the call is for station D the connection may be completed by way of spring jack 120 associated with channel 1 or spring jack 420 associated with channel 4, depending upon the indication of the corresponding busy lamps.

Let it be assumed that the call is for station B and that busy lamp 141 is dark indicating that channel 1 is available for use. Under these circumstances the operator inserts plug 9 of the pair of connecting cords into spring jack 140, and a circuit is thereupon completed that extends from battery through the winding of calling supervisory relay 14, registering sleeve contacts of plug 9 and spring jack 140, conductor 189, right hand armature and back contact of relay 145, left hand armature and back contact of relay 144, and winding of relay 142 to ground. Relay 142 in operating closes a circuit that extends from battery through the right hand winding of relay 143, front contact and armature of relay 142, conductor 128, back contact and armature of relay 132, conductor 118, back contact and armature of relay 122, conductor 108, outer right hand back contact and armature of relay 151, left hand back contact and armature of relay 155, and resting contact and switch spring of relay 156 to ground. The closure of this circuit energizes relay 143, and this relay in operating closes a circuit that extends from battery through the left hand winding and left hand front contact and armature of relay 143, conductor 127, left hand back contact and armature of relay 133, conductor 117, left hand back contact and armature of relay 123, conductor 107, winding of relay 151, left hand back contact and armature of relay 155 and resting contact and switch spring of relay 156 to ground. As a result of the closure of the above circuit relay 143 is locked up by way of its left hand winding and relay 151 is operated. Relay 151 in operating breaks at its outer right hand back contact the connection of conductor 108 with ground, so that thereafter, and until relay 151 is released, none of the relays 122, 132, etc., is effective to cause the energization of its associated relay 123, 133, etc. The relay 143, however, as above stated, is maintained energized by way of its left hand locking winding.

When relay 151 operates following the operation of relay 143 a circuit is closed that extends from battery through the winding of relay 144, conductor 101, outer right hand front contact and armature of relay 151, left hand back contact and armature of relay 155 and resting contact and switch spring of relay 56 to ground. Relay 144 in operating as a result of the closure of this circuit connects the branch talking conductors 187 and 188 of spring jack 140 into which the plug has been inserted to the main channel talking conductors 103 and 104; and at the same time a circuit is completed that extends from battery through the winding of cord circuit relay 14, registering sleeve contacts of plug 9 and spring jack 140, right hand armature and back contact of relay 145, left hand armature and front contact of relay 144, conductor 105 and winding of relay 150 to ground. The results of the operation of relay 150 will be described hereinafter.

The grounding of conductor 101 by the operation of relay 151 not only brings about the operation of the relay 144 of the channel branch that has been taken for use, but it also causes the operation of relays 125, 135, etc., of the other outgoing branches of this channel. The energizing circuits of the relays 125 and 135 extend in parallel branches from battery by way of the outer right hand back contacts and armatures of the associated relays 123 and 133, respectively, to the conductor 101, and thence to ground by way of the outer right hand front contact and armature of relay 151, left hand back contact and armature of relay 155 and resting contact and switch spring of relay 156. Each of the relays 125 and 135 in operating connects the two talking conductors 193, 194 and 190, 191 of its respective channel branch to the common conductors 10 and 11 which are connected with one winding of a transformer 12, the other winding of which is connected with the terminals of a source of busy tone current 13. As a result a busy tone is applied to the talking conductors of all of the outgoing spring jack branches of the channel excepting the particular branch which has been appropriated for use by the insertion of the connecting circuit plug 9. Consequently any attempt on the part of an operator to make connection with a branch terminal of a channel that is in use is met by a busy tone indication of the unavailability of the channel.

Each of the relays 125 and 135 of the busy channel in operating also at its outer armature connects the sleeve conductor of the associated channel branch to battery by way of a resistance, 126 and 136, respectively, at the same time disconnecting the sleeve conductor from its normal extension to ground by way of the winding of the associated relay 122 and 132, respectively. As a result, the channel branches that have not been taken for use are rendered ineffective to control their relays 122 and 132, respectively, and at the same time a busy test potential is applied to the sleeves or thimbles of the associated spring jacks 120 and 130, so that any operator in attempting to make connection with these channel branch terminals receives a busy test indication through the tip of the plug, the right hand armature and back contact of relay 14, and the special induction coil shown associated with the receiver of the operator's set.

The manner in which relay 150 (Fig. 3) is operated as a result of the extension of the channel conductors to the particular branch spring jack into which the connecting plug is inserted has been described.

When relay 150 operates it closes a circuit that extends from battery through the winding of relay 156 and inner right hand front contact and armature of relay 150 to ground. Relay 156 in operating closes a locking circuit for itself by way of its right hand front contact and armature and the outer left hand front contact and armature of relay 151 to ground. Relay 156 in operating breaks at its left hand switch spring and resting contact the path to ground over which the initial energizing circuits for the relays 151, 143, 125, 135 and 144 have been completed; but before this path to ground is interrupted at the contacts of relay 156 another path is completed to ground by way of the outer left hand front contact and armature of relay 150, so that the above mentioned relays are maintained operated under the control of the maintained energization of relay 150.

Relay 156 in operating also closes a circuit that extends from battery through the winding of relay 152 (Fig 3) and the left hand armature and switch spring of relay 156 to ground. Relay 152 in operating closes a circuit that extends from battery in parallel through the busy or guard lamps 121, 131, and 141 associated with outgoing spring jacks 120, 130 and 140 of the channel that has been taken for use and thence by way of conductor 100 and front contact and armature of relay 152 to ground. Thus in addition to the busy test and busy tone guarding indications applied to the connection terminals of the channel taken for use there is the indication afforded by the lighted guard lamp associated with each of the outgoing spring jacks of the channel. Furthermore, as an additional safeguard against interference with an existing connection it will be noted that each of the channel branches is normally disconnected from the main channel conductors at open contacts of the relays 124, 134 etc., only one of which relays at a time can operate to extend its associated branch to the main channel by virtue of the serial energizing circuit relation subsisting between the relays 142, 143, 132, 133, 122, 123 and the common relay 151, as hereinbefore described.

When relay 150 operates upon the extension of the main channel to the particular branch taken for use, it closes a circuit that extends from battery through the winding of relay 160, back contact and armature of relay 159 and outer right hand front contact and armature of relay 150 to ground. Relay 160 in operating closes a circuit that extends from battery through the winding of relay 165 (Fig. 4), conductor 182, and front contact and armature of relay 160 to ground. Relay 165 thereupon operates to connect the plate and filament batteries with the modulator MC—1 and amplifier HAC—1 of the transmitting branch of the channel. The effect of this is to cause the application of the particular carrier frequency of this channel to the toll line. Practically simultaneously with the application of the carrier frequency to the line the station selecting oscillator SO (Fig. 5) operates to modulate the carrier with the particular lower frequency required to bring about the selection of the distant station that is being called. But before describing this phase of the operation the effect at the distant stations of the application of the carrier frequency will be described.

On account of the balanced relation which exists in the high frequency hybrid coil 80 between the balancing network N and the external circuits connected with the coil, the carrier frequency applied by way of the transmitting conductors T and the bridge winding of the hybrid coil is not carried through into the receiving conductors R of the station where the carrier is applied. But at all of the other stations of the toll line the carrier frequency is carried through the hybrid coil 80 to the main receiving conductors R and diverted by way of the band filter DFC—1 into the receiving branch of the corresponding high frequency channel. As previously described, the receiving branch of each channel is so arranged as to convey the high frequency carrier wave components to the rectifier tube HRC—1, the output circuit of which includes the relay 19. Consequently the instant the carrier frequency of channel C—1 is applied at the calling station, the relay 19 at each of the other stations is operated. When relay 19 operates it closes a circuit that extends from battery through the winding of relay 155 (Fig. 3), conductor 186, and front contact and armature of relay 19 to ground. Relay 155 in operating closes a circuit that extends from battery through the winding of relay 152, left hand front contact and armature of relay 155, and resting contact and switch spring of relay 156 to ground. As a result at all of the distant stations the relay 152 of the particular channel that has been taken for use operates and applies ground to conductor 100 to cause the lighting of all of the busy or guard lamps, as 121, 131, 141, associated with the spring jacks of the outgoing branches of this channel. The operation of the left hand armature of relay 155 also breaks at the resting contact of the associated switch spring the normal connection to ground over which the initial energization of the branch controlling relays 123, 124, 133, 134, 143, 144 and the associated common relay 151 is effected. Furthermore, relay 155 in operating closes a circuit that extends from battery in parallel branches through the windings of the relays 125, 135 and 145 associated with the various channel branches, the outer right hand back contacts and armatures of the associated relays 123, 133 and 143, and by way of conductor 101, outer left hand front contact and armature of relay 155, and outer left hand back contact and armature of relay 151 to ground. As a result, relays 125, 135 and 145 all operate and bring about the application of the busy tone from busy tone generator 13 to the talking conductors of their respective branches and the application of busy test potential to the test sleeves of spring jacks 120, 130 and 140 of their respective branches, in the manner that has heretofore been described. Therefore, the effect of the application of the carrier frequency of the selected channel is incidentally to mark as busy and protect from intrusion the branches of the selected station at all the distant stations as well as at the home or calling station.

Returning now to the operations which take place at the calling station, when the relay 143 (Fig. 2) of the selected channel branch operates it closes a circuit that extends from battery through the winding of relay 175 (Fig. 3), winding of relay 174, conductor 149, inner right hand front contact and armature of relay 143, conductor 102 and left hand back contact and armature of relay 163 to ground. The effect of the closure of this circuit is to operate relays 175 and 174. If it had been the relay 133 of the channel branch extending to spring jack 130 that had operated, relays 173 and 175 would have been operated by way of conductor 139, and if it had been relay 123 associated with the channel branch to spring jack 120 that had operated, relays 172 and 175 would have been operated by way of conductor 129. As it is station B that is assumed to have been called by the insertion of the connecting circuit plug into the spring jack 140, it is relays 174 and 175 that are operated. Relay 175 in operating closes a circuit that extends from battery through the left hand winding of relay 176, right hand front contact and armature of relay 175, conductor 60, right hand back contact and armature of relay 50 of the common timing group, and back contact and armature of relay 55 to ground. The resultant operation of relay 176 closes a circuit that extends from battery through right winding and right hand front contact and armature of relay 176, conductor 62, winding of relay 50 and back contact and armature of relay 55 to ground. As a result relay 176 is locked up and relay 50 of the common timing group is operated. Relay 50 in operating breaks the common initial energizing circuit by way of conductor 60 for the entire series of relays 176 of the various channels that are served by the common timing group of apparatus; and at the same time relay 176 in operating interrupts the normal extension of conductors 61 and 62 by way of back contacts of relay 176 to other similar relays of the successive channels served by the common apparatus. Thus it is impossible to bring about the operation of the relay 176 of more than a single channel at the same time. The extended starting circuit represented by the conductors 61 and 62 extends serially not only through the four channels C—1, C—2, C—3 and C—4 of the particular carrier multiplex toll line illustrated, but may also extend through the corresponding channel apparatus of other carrier multiplex toll lines entering the same station.

When the relay 176 is operated, as described above, it closes a circuit that extends from battery through the winding of relay 177, left hand front contact and armature of relay 176, conductor 61, right hand front contact and armature of relay 50 and back contact and armature of relay 55 to ground. Relay 177 in operating closes a circuit that extends from battery through the winding of relay 164 (Fig. 4), conductor 180, and innermost front contact and armature of relay 177 to ground. Relay 164 in operating connects one winding of the inductive coupling 92 in the input circuit of modulator MC—1 with potentiometer 162 which is connected by conductors 166 and 167 with the common supply leads or conductors 66 and 67 extending from the station selecting oscillator SO and its associated group of apparatus. At the same time relay 164 in operating completes operative connection between the relays 137, 138, 147 and 148 that control the artificial line sections in the transmitting and receiving branches of channel C—1, conductors 168 and 169, and the common conductors 68 and 69 extending to contacts of relays 23 and 24 in the group of apparatus associated with the oscillator SO. Consequently the operation of relay 164 as a result of the energization of relay 177 places channel C—1 under the control of the common station selecting oscillator SO and its associated apparatus.

Relay 177 in operating also, by the closure of its other three front contacts, places the common conductors 72, 73 and 74 under the control of contacts of relays 172, 173 and 174 of channel C—1. Of these three relays relay 174 alone is at this time energized, as has been described, relays 172 and 173 being inert. Consequently the operation of relay 177 closes a circuit that extends from battery through the winding of relay 21 of the station selecting group of apparatus (Fig. 5), left-hand armature and back contact of relay 20, winding of relay 24, conductor 74, second armature and front contact of relay 177, and front contact and armature of relay 174 to ground. Relay 21 in operating connects the plate and filament batteries with oscillator SO and amplifier SA, thus causing the generation and amplification of low frequency oscillatory current and its application to the common conductors 66 and 67. Relay 24 in operating closes the tuning branch of oscillator SO including condenser 34. The effect of the closure of this tuning branch is to cause oscillator SO to generate oscillatory current having a frequency such as to be selected by the tuned circuit SC—1 (Fig. 4) of the particular station, station B that is being called, and by the tuned circuit of this station only. The oscillatory current thus generated is applied to the transmitting branch of channel C—1 of the calling station by way of conductors 66 and 67, potentiometer 162, left-hand front contacts and armatures of relay 164, and inductive coupling 92 in the input circuit of the modulator MC—1. At this point the low frequency selecting current causes the modulation of the carrier wave that is being applied to the modulator MC—1 from the harmonic supply leads 47, 48 by way of amplifier HAC—1 and its associated tuned circuit, and potentiometer 91. At the same time relay 24 of the station selecting group apparatus at its left-hand armature and front contacts applies ground to the common conductors 68 and 69, thus causing the energization of relays 137 and 138 of the transmitting branch and relays 147 and 148 of the receiving branch of channel C—1, by way of the right hand front contacts and armatures of relay 164. Relays 137, 138, 147 and 148 are all operated to include their artificial line sections in the transmitting and receiving branches, and are maintained operated by a locking circuit that extends by way of the inner lower front contacts and armatures of relays 137 and 138, conductor 181, and the outer right hand front contact and armature of relay 150 to ground. Thus after their initial operation during the temporary association of the station selecting apparatus the relays 137, 138, 147 and 148 are held operated to keep their respective artificial line sections included in the transmitting and receiving branches of channel C—1 as long as relay 150 is maintained energized by the presence of the connecting circuit plug 9 in the spring jack 140 of the associated branch of the channel.

The function of the artifical line sections thus introduced is to keep the volume of transmission in the circuit substantially constant irrespective of the distance between the toll stations that the channel is serving to interconnect. Thus, in the present instance, where it is assumed that the connection in process of establishment is between station A and station B, which is the least remote of the other stations on the line, the act which serves to modulate the carrier with the frequency for selecting station B also brings about the introduction of the maximum artificial attenuation in the channel to compensate for the lesser degree of natural line attenuation between these two stations. If it is assumed that station A is calling station C, which is somewhat more remote, the relay 23 of the station selecting group, in operating to close the tuning branch of oscillator SO for applying to the carrier wave a modulating frequency to which the tuned circuit SC—1 of station C is selective, also grounds conductor 69 to cause the operation of relays 138 and 148 and the inclusion in the transmitting and receiving channel branches of the artificial line sections associated with these two relays. Relay 23 does not apply ground to conductor 68 and consequently the artificial line sections associated with relays 137 and 147 are not included. If it is assumed that it is station D that is being called by station A, the resultant operation of relay 22 of the station selecting group to tune oscillator SO for the generation of the calling frequency to which the tuned circuit SC—1 of station D is responsive, does not apply ground to either of the two conductors 68 and 69. Consequently when it is the most remote of the three stations that is being called by station A no artificial attenuation is introduced into the communicating channel. This feature of automatically adjusting the channel attenuation in accordance with the particular one of the distant stations that is being called is the subject of a patent of the present inventor No. 1,542,121, issued June 16, 1925, and is illustrated and described herein merely to make clear its relationship to the particular features toward which the present application is directed.

As has been described, the station selecting group of apparatus is automatically brought into operative relation with the particular channel that has been taken for use in extending an outgoing call, and the station selecting oscillator SO is automatically energized and tuned to generate a wave of the particular frequency required for the selection of the station that is being called. The duration of application of the station selecting wave and the duration of the supplementary modulating wave that follows are under the control of the common timing apparatus including the relays 50 to 55. When relay 50 of the common timing group is operated, as has been described, by the operation of relay 176 consequent upon the taking of this particular channel for use, it closes a circuit that extends from battery through the winding of relay 51, right hand back contact and armature of relay 52, left hand front contact and armature of relay 50, outer left hand armature and back contact of relay 54, and back contact and armature of relay 55 to ground. Relay 51 in operating closes a circuit extending from battery through the winding of relay 52, front contact and armature of relay 51, outer armature and back contact of relay 54, and back contact and armature of relay 55 to ground. Relay 52 in operating locks up by way of its right hand front contact and armature, left hand front contact and armature of relay 50, outer armature and back contact of relay 54 and back contact and armature of relay 55. Relay 52 in operating also, at its right hand back contact, breaks the previously traced energizing circuit of relay 51. Relay 51 is made slow to release, and after an interval opens its front contact and closes its back contact. When this occurs a circuit is completed that extends from battery through the winding of relay 54, inner right hand back contact and armature of relay 53, left hand armature and front contact of relay 52, back contact and armature of relay 51, outer left hand armature and back contact of relay 54 and back contact and armature of relay 55 to ground. Relay 54 thereupon operates and closes a locking circuit for itself that extends by way of its inner front contact and armature, winding of relay 53 and back contact and armature of relay 55 to ground. The contacts of relay 54 are so adjusted that the inner contact is closed before the outer contact is broken. As a result the holding circuit of the relay 54 is closed at its inner front contact before the previously traced initial energizing circuit of the relay is opened at its back contact. The relay 53 is not energized until after the circuit by way of the back contact of relay 54 is opened, as this circuit branch constitutes a short circuit of the branch including the winding of relay 53. But when the back contact of relay 54 is opened relay 53 is energized by way of the holding path of relay 54 previously traced, and relay 52 deenergizes due to the opening of its locking circuit at the outer armature and back contact of relay 54.

When relay 53 operates, which occurs as a result of the above described operations a certain measured interval after the initial operation of relay 50, it closes a circuit that extends from battery through the winding of relay 21 of the station selecting group, winding of relay 20, left hand front contact and armature of relay 53 and back contact and armature of relay 55 to ground. The energizing path thus closed maintains the energization of the previously operated relay 21 and operates relay 20. Relay 20 in operating breaks the energizing circuit of relay 24, thus withdrawing ground from conductors 68 and 69 and breaking the initial energizing circuits of the artificial line section controlling relays 137, 138, 147 and 148. These relays, however, remain energized as a result of their locking circuit by way of conductor 181 which was previously traced. Relay 24 in releasing also breaks the tuning branch of the oscillator SO including condenser 34 which up to this time had been maintained closed; and at the same time relay 20 in operating closes the tuning branch for oscillator SO including the condenser 30. This has the effect of changing the frequency of the oscillatory current generated by the oscillator from the frequency adapted to cause the selective response of the apparatus at station B alone to the frequency that is adapted to cause the selective response of the apparatus associated with the tuned circuits CC—1 in the receiving branches of channel C—1 at all of the distant stations. The operation of relay 53 of the common timing group also closes a circuit that extends from battery through the left-hand winding of relay 163 (Fig. 3), outer right-hand front contact and armature of relay 176, conductor 70, left-hand front contact and armature of relay 53, and back contact and armature of relay 55 to ground. Relay 163 in operating locks up by way of its right-hand winding and inner right-hand front contact and armature and left-hand armature and switch spring of relay 156 to ground, relay 156 having been operated by the operation of relay 150 upon the insertion of the connecting cord plug in the channel branch spring jack. Relay 163 in operating also breaks, at its left-hand back contact and armature, the circuit previously traced that up to this moment has maintained the energization of relays 174 and 175 by way of conductor 149, inner right-hand front contact and armature of relay 143 and conductor 102. The consequent release of relay 174 breaks the energizing circuit of relay 24 of the station selecting group, which energizing circuit had, a moment before, as described, been broken by the energization of relay 20. Relay 175 in releasing, as a result of the operation of relay 163, closes the normal extension of common conductor 60, which conductor, however, is still interrupted at the right-hand back contact and armature of relay 50. The operation of relay 163, therefore, restores to normal the relay 175 and which ever of the relays 172, 173 and 174 has been operated, and holds all of these relays inoperative until relay 163 is released—that is, until the associated channel is released and again made available for use.

When relay 163 operates it also closes a circuit that extends from battery through the winding of relay 116 (Fig. 4), conductor 185 and the outer right hand front contact and armature of relay 163 to ground. Conductor 185 is also connected to ground at this time by way of the outer right hand contact and armature of relay 170, this relay being energized by way of its right hand winding and the left hand front contact and armature of relay 163. When relay 116 operates as a result of the closure of the above traced circuit, it disconnects the terminals of the low pass filter LPC—1 from the tuned circuits SC—1 and CC—1 and connects them to conductors 116' and 117' that extend to the bridged winding of the low frequency hybrid coil 161. This prepares the receiving branch of the communicating channel for the conversation that is about to take place, and insures the station selecting and controlling branches SC—1 and CC—1 against operating in response to the frequencies for which they are tuned that may be included in the voice frequencies that are transmitted over the channel in connection with the ensuing conversation.

Continuing now with the further operations that take place under the control of the common timing group of apparatus, the operation of relay 53 that brings about the actions above described also closes a circuit that extends from battery through the winding of relay 51, right hand back contact and armature of relay 52, left-hand front contact and armature of relay 50, and outer right hand front contact and armature of relay 53 to ground. Relay 51 in operating closes a circuit that extends from battery through the winding of relay 52, front contact and armature of relay 51 and outer right hand front contact and armature of relay 53 to ground. Relay 52 in operating locks up over a circuit that extends by way of right hand front contact and armature of relay 50 and outer right hand front contact and armature of relay 53 to ground. The operation of relay 52 also opens the energization circuit of relay 51 and that relay, being slow releasing, releases its armature after an interval. As relay 52 is now operated, the release of relay 51 closes a circuit that extends from battery through the winding of relay 55, inner right hand front contact and armature of relay 53, left hand armature and front contact of relay 52, back contact and armature of relay 51, and outer right hand front contact and armature of relay 53 to ground. When relay 55 operates as a result of the closure of this circuit, it interrupts the circuit that has been holding relays 54 and 53 operated, and relay 53 in releasing breaks the energizing circuit of relay 52. The release of relays 52 and 53 interrupts the energizing circuit of relay 55. But as relay 55 is a slow releasing relay an appreciable interval of time elapses between the opening and the closing of the back contact of relay 55. This opening of the back contact of relay 55 also breaks the serial holding circuit of relays 50 and 176 and also breaks the energizing circuit of relay 177. These relays thereupon release, thus restoring to normal the controlling parts that temporarily associate the station selecting group of apparatus and the common timing group of apparatus with the channel over which the call is being extended.

From the above it may be seen that the effect of inserting the connecting circuit plug 9 into spring jack 140 of channel C—1 has been to appropriate the channel for the exclusive use of the associated branch, and to modulate the carrier frequency applied to the channel, first, by a frequency to which the tuned circuit SC—1 of station B alone is responsive, then to change the modulating frequency to one to which the tuned circuits CC—1 of all of the distant stations are responsive, and finally to withdraw this second modulating frequency. When the tuned circuit SC—1 at station B responds to the first modulating frequency applied, the resultant current flowing in the circuit is rectified in the tube SRC—1 and causes the operation of relay 178. Relay 178 in operating closes a circuit that extends from battery through the winding of relay 171 (Fig. 3) conductor 184, and front contact and armature of relay 178 to ground. Relay 171 at station B in operating locks up by way of a path to ground including the right hand front contact and armature of relay 171, left hand front contact and armature of relay 155 and resting contact and switch spring of relay 156. As heretofore explained the relays 155 associated with the channel C—1 at all of the distant stations, including called station B, were operated by the energization of relay 19 (Fig. 4) upon the application of the carrier to the channel at the calling station. A few moments later the oscillator SO at the calling station sends out the modulating frequency to which the tuned circuit CC—1 at the called station B and at the other distant stations are responsive. The current flowing in the tuned circuit CC—1 is rectified in tube CRC—1 and causes the operation of relay 179. Relay 179 in operating acts by way of the left hand winding of relay 170 and conductor 183 to energize relay 170; and that relay in operating locks up by way of its left hand front contact and armature, left hand front contact and armature of relay 155 and resting contact and switch spring of relay 156 to ground. Relay 170 at called station B, and also at all of the other distant stations, in operating closes a circuit that extends from battery through the winding or relay 116 (Fig. 4), conductor 185, and outer right-hand front contact and armature of relay 170 to ground; and relay 116 in operating disconnects the terminals of the low pass filter LPC—1 of the receiving branch from the tuned circuits SC—1 and CC—1 and their associated apparatus and connects the receiving branch with conductors 116' and 117' extending to the bridged winding of the low frequency hybrid coil 161. At the called station B this has the effect of preventing any response of the tuned circuits SC—1 and CC—1 to subsequent conversational frequencies corresponding to those to which these circuits are tuned, and of bringing the receiving branch of the channel into operative relation with the talking conductors 103 and 104. At the other stations that are not being called the effect of the operation of relay 116 is the same, excepting that the extension of the receiving branch to conductors 103 and 104 is ineffective for the reason that these conductors are not further extended to any of the branch connection terminals.

At the called station B, which is the only station at which the application of the first applied modulating frequency has caused the operation of relay 171, a circuit is now closed that extends from battery through the winding of relay 112 (Fig. 2), conductor 119, left-hand front contact and armature of relay 171, inner right-hand contact and armature of relay 170, and left-hand back contact and armature of relay 163 to ground. When relay 112 operates it connects the channel talking conductors 103 and 104 to branch talking conductors 196 and 197 extending to answering spring jack 110 associated at station B with channel 1. It also extends the sleeve of spring jack 110 by way of conductor 198, inner left-hand front contact and armature of relay 112 and conductor 105 to the winding of relay 150; and closes a circuit that extends from battery through calling lamp 111 associated with spring jack 110, conductor 199, outer left-hand front contact and armature of relay 112, conductor 113 and outer right-hand back contact and armature of relay 150 to ground. This causes the illumination of calling lamp 111 and notifies the operator at called station B that there is an incoming call on spring jack 110 of channel 1.

In response to the lighting of lamp 111, the operator at the called station inserts the plug 9 of one of her pairs of connecting cords into corresponding spring jack 110. This extends the talking conductors of the channel to the talking conductors of the connecting cord circuit, and also completes an energizing circuit by way of the registering sleeve contacts of plug 9 and spring jack 110 and the path already traced for relay 14 of the cord circuit and relay 150 (Fig. 3) of channel C—1. When relay 150 operates it interrupts at its outer left-hand back contact the energizing circuit of calling lamp 111 and extinguishes that lamp. It also closes a path to ground from conductor 101 in parallel with the path previously closed by way of the inner right-hand front contact and armature of relay 155 and outer right-hand back contact and armature of relay 151, so that any subsequent momentary withdrawal of the carrier frequency from the line in signaling, as will subsequently be described, may not result in the deenergization of relays 125, 135, etc. (Fig. 2) to withdraw the busy indications from the channel branches. Relay 150 in operating also closes at its inner right-hand front contact and armature an energizing circuit for relay 156; and the latter relay in operating substitutes a direct holding path to ground for relays 152, 170 and 171 in place of the holding path by way of left-hand front contact and armature of relay 155 and resting contact and switch spring of relay 156. This also is to prevent any subsequent signaling release of relay 155 from disestablishing the existing circuit conditions.

Relay 150 at the called station, when it operates as a result of the insertion of the connecting circuit plug into answering spring jack 110, also closes a circuit that extends from battery through the winding of relay 160 (Fig. 3), back contact and armature of relay 159 and outer right-hand front contact and armature of relay 150 to ground. Relay 160 in operating closes a circuit that extends from battery through winding of relay 165 (Fig. 4), conductor 182 and front contact and armature of relay 160 to ground. When relay 165 operates it causes the application of the plate and filament batteries to energize the amplifier HAC—1 and the modulator MC—1 of the transmitting branch of channel C—1 and to cause the corresponding carrier wave to be applied to the line. As has been explained, the condition of balance that exists in the high frequency hybrid coils 80 is such that while the application of the carrier frequency at one station causes this frequency to flow in the receiving branches of the corresponding channels at all other stations, the carrier frequency does not flow in the receiving branch of the corresponding channel at the station where the carrier is applied. Consequently while the calling station has previously caused the carrier frequency of channel 1 to flow in the receiving branches of this channel at the distant stations, it is not until the above described application of the corresponding frequency at the called station B that the carrier frequency enters the receiving branch RC—1 of channel C—1 at the calling station. Therefore, when the relay 165 of the called station operates to energize amplifier HAC—1 and modulator MC—1, the relay 19 in the receiving branch of channel C—1 at the calling station is energized for the first time. When relay 19 at the calling station operates it closes a circuit from battery through the winding of relay 155 (Fig. 3), conductor 186 and front contact and armature of relay 19 to ground. Relay 155 thereupon operates and closes a circuit that extends from battery through the winding of relay 154, outer left-hand back contact and armature of relay 157, right-hand front contact and armature of relay 155, and inner left-hand front contact and armature of relay 150 to ground, relay 150 having previously been operated when plug 9 was inserted in spring jack 140 upon the initiation of the call. Relay 154 now operates and closes a circuit that extends from battery through the winding of ringing relay 157, outer right-hand armature and back contact of relay 153, inner left-hand front contact and armature of relay 151 (this relay having remained locked up from the moment the call was initiated), front contact and armature of relay 154, and armature and switch spring of relay 156 to ground. As a result the ringing relay 157 operates and connects ringing generator 78 with talking conductors 103 and 104 which are now extended by way of spring jack 140 and plug 9 to the talking conductors of the calling operator's connecting circuit. The ringing current thus applied flows through the left-hand winding of relay 15 of the cord circuit, and that relay in operating locks up by way of its right-hand winding, front contact and armature, normally closed local contacts of listening key 7, and front contact and armature of relay 14 to ground, the closure of this path to ground also lighting the cord circuit supervisory lamp 16. The above described application of ringing current is only of momentary duration. The operation of relay 157 which applies the ringing current also interrupts, at the outer left-hand back contact and armature of relay 157, the energizing circuit of relay 154. Relay 154, being slow releasing, releases after an interval, thus breaking the initial energizing circuit of relay 157 previously traced. This, however, does not release relay 157 as that relay in operating has closed an alternative energizing circuit for itself by way of outer right-hand armature and back contact of relay 153, outer left-hand front contact and armature of relay 157, outer right-hand front contact and armature of relay 155, and inner left-hand front contact and armature of relay 150 to ground. But in releasing relay 154 closes a circuit that extends from battery through winding of relay 153, switch spring and resting contact of that relay, inner front contact and armature of relay 157, back contact and armature of relay 154, and armature and switch spring of relay 156 to ground. As a result, relay 153 operates, and locks up by way of its left-hand switch spring and armature, and left-hand armature and switch spring of relay 156 to ground. Relay 153 in operating again closes an energizing path for relay 154 which extends from battery by way of the winding of that relay, inner right-hand front contact and armature of relay 153, outer right-hand front contact and armature of relay 155 and inner left-hand front contact and armature of relay 150 to ground. At the same time relay 153 in operating opens at its outer right-hand armature and back contact the path which up to this time has been maintaining the energization of ringing relay 157, and which has previously been traced from the winding of relay 157 by way of outer right-hand armature and back contact of relay 153, outer left-hand front contact and armature of relay 157, and the contacts of relays 155 and 150 to ground. The control of relay 157 is now transferred by way of the outer right-hand armature and front contact of relay 153 to branch paths that are adapted to extend by way of inner left-hand armature and front contact of relay 157 to left-hand resting contact of relay 153 and by way of back contact and armature of relay 154 to ground at left-hand armature and switch spring of relay 156. But the first mentioned of these paths is now maintained opened by the previously described locking up of relay 153 and the second mentioned path is at present held open by the energization of relay 154, which was described as occurring when relay 153 operates. Therefore, relay 157 is released to disconnect the ringing generator and extend talking conductors 103 and 104 through to the line windings of the low frequency hybrid coil 161.

As has been stated the effect of the above described momentary application of ringing current to the incoming talking conductors of the channel is to light the cord circuit supervisory lamp 16. This constitutes a notification to the calling station operator that the called station operator has responded to the call and is connected with the circuit. The calling station operator thereupon connects her telephone set with the circuit by operating the listening key 7, which incidentally has the effect of extinguishing lamp 16 by interrupting the locking circuit of relay 15 at the local contacts of the listening key. The calling and called station operators are now in communication, and connection may be completed with the local subscribers' lines or other toll lines at the two stations in the usual way.

If during the existence of the connection between the two stations it is necessary for either operator to signal the other, this may be done by operating the connecting circuit ringing key 17 at either end of the connection in the usual way. Assuming that the operator at the called station B has occasion to signal the operator at the calling station A, the operator at station B presses ringing key 17, thus applying ringing current by way of branch conductors 196 and 197, contacts of relay 12, and main conductors 103 and 104 to the winding of relay 159 (Fig. 3) bridged across the talking conductors. Relay 159 in operating opens the energizing circuit of relay 160. Relay 160 is made slow to release, so that it is unaffected by momentary interruption of its energizing circuit, but is deenergized and permits the retraction of its armature when the interruption is of such duration as that occasioned by the application of ringing current to relay 159. When relay 160 retracts its armature, the energizing circuit of relay 165 (Fig. 4) is interrupted, and the resultant disconnection of the plate and filament batteries from amplifier HAC—1 and modulator MC—1 causes the withdrawal of the carrier wave from the channel. At all stations on the line other than the calling station A, this withdrawal of the carrier wave at station B is ineffective to bring about the deenergization of relay 19 in the receiving branch of the corresponding channel, for the reason that the receiving branch of the corresponding channel at each of the stations not a party to the connection receives the carrier wave from both the calling and called stations, so that the withdrawal of the carrier at either of the connected stations still leaves the relay 19 at each of the stations that are not parties to the connection energized by the carrier wave applied at the other station. But each of the relays 19 at the calling and called stations is held energized only by the carrier wave applied at the other station, and on account of the balance in the high frequency hybrid coil 80 is unaffected by the carrier wave applied at its own station. As a result, the assumed withdrawal of the carrier wave at the called station causes the deenergization of the relay 19 at the calling station, but leaves the relay 19 at the other stations still energized by the calling station carrier wave to maintain the unavailable condition of the channel at such other stations.

When relay 19 at the calling station releases it opens the energizing circuit of and releases relay 155; and that relay in releasing opens the energizing circuit of relay 154 that has been maintained closed by way of inner right-hand front contact and armature of relay 153, right-hand front contact and armature of relay 155, and inner left-hand front contact and armature of relay 150 to ground, from the time when relay 153 was first energized by the momentary operation of relay 157 to give the return signal from the called station, as previously described. When relay 154 releases it closes a circuit that extends from battery through the winding of ringing relay 157, outer right-hand armature and front contact of relay 153, back contact and armature of relay 154, and left-hand armature and switch spring of relay 156 to ground. Therefore ringing relay 157 is held energized to apply ringing current to talking conductors 103 and 104 as long as relays 154, 155 and 19 remain deenergized; that is, as long as the carrier wave is withdrawn at the distant or called station. The effect of the application of ringing current to conductors 103 and 104 by the operation of relay 157 is to cause the energization of relay 15 of the connecting cord circuit at the calling station and the consequent locking up of relay 15 and lighting of the supervisory lamp 16. The lighting of the lamp 16 serves as a notification to the operator that the connection is to be supervised; and when the operator throws listening key 7 to connect her telephone set 8 with the circuit, lamp 16 is extinguished as previously described.

In like manner the operator at the calling station can bring about the lighting of lamp 16 in the cord circuit at the called station. In this case, however, it should be noted that the locking up of relay 153 (Fig. 3) at the called station to give relay 155 control over relay 154 is not attended by a momentary operation of the ringing relay 157, as is the case at the calling station. At the called station when relay 155 is operated as a result of the application of the carrier at the calling station, and when relay 150 is operated as a result of the insertion of a connecting circuit plug in the answering spring jack 110 in response to the lighting of calling lamp 111, a circuit is closed that extends from battery through the winding of relay 154, outer left-hand back contact and armature of relay 157, right-hand front contact and armature of relay 155 and inner left-hand front contact and armature of relay 150 to ground. At the called station the relay 151 is not operated, as its energization is brought about only as a result of an outgoing call initiated at the corresponding station. Consequently when relay 154 is energized by the closure of the circuit that has been traced, it closes a circuit that extends from battery through the winding of relay 153, inner right-hand back contact and armature of relay 151, front contact and armature of relay 154, and left-hand armature and switch spring of relay 156 to ground. Thereupon relay 153 locks up by way of its left-hand switch spring and armature and left-hand armature and switch spring of relay 156 to ground. The operation of relay 153 closes a circuit that extends from battery through the winding of relay 154, inner right-hand front contact and armature of relay 153, right-hand front contact and armature of relay 155 and inner left-hand front contact and armature of relay 150 to ground. The condition, therefore, at the called station while the two stations are connected is such that when the calling station applies ringing current to operate relay 159 to release relays 160 and 165 and thus withdraw the carrier, relays 19, 155 and 154 at the called station are released and a circuit is closed that extends from battery through the winding of ringing relay 157, outer right hand armature and front contact of relay 153, back contact and armature of relay 154, and armature and switch spring of relay 156 to ground. The operation of relay 157 connects ringing generator 78 with talking conductors 103 and 104 and brings about the lighting of the connecting cord circuit supervisory lamp 16 as hereinbefore described.

When the operator at either of the toll stations is informed by the lighting of the supervisory lamp 18 and her supervision of the connection that the conversation is completed she disconnects by withdrawing the connecting circuit plug 9 from the channel branch springjack in which it has been inserted. Assuming that the operator at the calling station is the first to withdraw plug 9 from its springjack, the effect is to interrupt the energizing circuit of relay 150 at the registering contacts of the plug and springjack and bring about the release of that relay. When relay 150 releases, it interrupts at its outer right hand armature and front contact the holding circuit that has been maintaining relays 151 and 143 (Fig. 2) operated. Upon the assumption that the called station operator has not yet disconnected, relay 155 of the calling station is still maintained operated by the carrier applied at the called station; and consequently the initial energizing path for relays 151 and 143 is held open at left-hand back contact and armature of relay 155. Consequently the release of relay 150 upon the withdrawal of the connecting circuit plug at the associated station results in the release of relays 144 (Fig. 2) to disconnect the channel talking conductors from their extension to outgoing branch spring jack 140. Upon the release of relay 151 a branch from conductor 101 to ground is closed by way of outer left-hand front contact and armature of relay 155 and outer left-hand back contact and armature of relay 151. This immediately reenergizes relays 125 and 135, and also energizes relay 145 of the channel branch from which the plug has just been withdrawn. As a result the busy test condition is now maintained upon all the channel branches pending the release of relay 155. Relay 150 in releasing upon the withdrawal of the plug also opens the initial energizing circuit of relay 156, and as the holding circuit of relay 156 has now been opened at the outer right-hand front contact and armature of relay 151 by the release of that relay, relay 156 is released to interrupt at its left-hand armature and switch spring the direct path to ground that has been holding energized relays 152, 163 and 170. But before this path to ground is interrupted another path is completed by way of the left-hand switch spring and back contact of relay 156 and left-hand armature and front contact of relay 155 held energized from the distant called station; so that relays 152, 163 and 170 are now maintained operated subject to the control of relay 155. Consequently relay 152 keeps lighted the busy lamps 121, 131 and 141 associated with the outgoing branches of the channel at the calling station, relay 163 holds interrupted the path by way of conductor 102 for energizing the station selection controlling relays 172, 173 and 174, and relays 163 and 170 together hold closed the energizing path for relay 116 by way of conductor 185, thus preventing the reconnection of tuned circuits SC—1 and CC—1 with the channel. The release of relay 150 also opens, at the inner left-hand armature and front contact of that relay, the energizing circuit of relay 154, and the release of relay 154 closes the energizing circuit of ringing relay 157. But as the various branches of conductors 103 and 104 are now open, the consequent application of ringing current to conductors 103 and 104 is without effect.

Relay 150 at the calling station in releasing upon the withdrawal of plug 9 from springjack 140 also breaks the energizing circuit of relay 160, and relay 160 in releasing causes the release of relay 165 and the withdrawal of the carrier from the transmitting branch of the channel at the calling station. As a result relay 155 at the called station is released, thus breaking at its outer right hand armature and front contact the energizing circuit of relay 154, which relay in releasing causes the operation of relay 157 and the application of ringing current to the connecting cord circuit by way of answering springjack 110 and plug 9 of the connecting cord circuit. In response to the disconnect signal constituted by the consequent lighting of supervisory lamp 16 and the presence of ringing current on the connection, the called station operator withdraws plug 9 from springjack 110. Thereupon relay 150 (Fig. 3) releases and releases relay 156. The latter relay in releasing disconnects from the holding conductor the direct path to ground that has been maintaining relays 152, 170 and 171 operated, the other path to ground from the holding conductor having previously been interrupted at the left hand front contact and armature of relay 155 upon the releasing of that relay. Relays 170 and 171 in releasing break the circuit by way of conductor 119 that has been holding relay 112 energized; and that relay in releasing disconnects from the main channel conductor the four conductors 196, 197, 198 and 199 extending to the answering springjack 110 and lamp 111. At the same time relay 170 in releasing interrupts conductor 185 over which relay 116 (Fig. 4) has been energized, thus disconnecting the receiving branch of the channel from the low frequency hybrid coil 161 and connecting it with the tuned circuits SC—1 and CC—1 in readiness to respond to another call. Relay 150 at the called station, in releasing upon the withdrawal of plug 9 from answering springjack 110, also releases relay 160, which in turn releases relay 165, thus withdrawing the carrier wave from the transmitting branch of the channel at the called station.

The carrier wave is now withdrawn from the channel at both the calling and the called stations. Consequently the relays 155 associated with this channel at the stations that were not called release, thus releasing their associated relays 152 to extinguish the busy lamps 121, 131, and 141 associated with the outgoing springjacks of the channel, and disconnecting ground from conductor 101 to release the relays 125, 135 and 145 associated with the various branches and make the channel again accessible by way of its branches at these stations. Relay 155 at each of the other stations in releasing also interrupts the locking circuit of relay 170 associated with the channel that has been in use; and relay 170 in releasing deenergizes relay 116 to bring the tuned circuits SC—1 and CC—1 again into operative relation with the receiving branch of the channel.

At the calling station, where the disconnect is assumed to have been originated, the withdrawal of the carrier wave at the called station causes the release of relay 19 and the associated relay 155. The last mentioned relay in releasing now interrupts at its left hand front contact and armature the path to ground that since the previously described release of relay 156 has been holding operated relays 152, 163 and 170. Relay 152 in releasing extinguishes the busy lamps associated with the springjacks of the outgoing branches of the channel. Relays 163 and 170 in releasing cause relay 116 to release and bring about the reconnection of the tuned circuits SC—1 and CC—1 with the receiving branch of the channel. Relay 155 in releasing also opens at its inner right hand front contact and armature the path to ground from conductor 101 which has been holding energized the relays 125, 135 and 145. These relays thereupon release and remove the busy test conditions from the corresponding channel branches. This completes the disconnecting operation and the restoring of the channel to its normal condition.

If it is assumed that the called station operator is the first to withdraw the connecting circuit plug from the springjack at the end of the conversation, the resultant release of relay 150 releases relay 156, and relay 156 substitutes the holding path to ground by way of its switch spring and back contact and the left hand armature and front contact of relay 155 for the previously existing direct path by way of the switch spring and armature of relay 156. This leaves the holding path under the sole control of relay 155, so that relays 152, 170 and 171 are released upon the deenergization of relay 155 following the subsequent withdrawing of the carrier at the calling station. Relay 150 in releasing interrupts at its outer left hand front contact and armature the path to ground from conductor 101; but the path to ground by way of the outer left hand front contact and armature of relay 155 and outer left hand back contact and armature of relay 151 is still closed, thus maintaining operated the relays 125, 135 and 145 for maintaining the busy test condition on the channel branches. As relays 170 and 171 remain locked up, relay 112 remains energized and keeps the conductors extending to the answering springjack 110 and lamp 111 connected with the main channel conductors. Consequently the interruption of the energizing circuit of relay 154 at the called station upon the release of relay 150 operates relay 157 to connect ringing generator back to answering springjack 110. But this is without effect, for the reason that the plug has been withdrawn from this springjack.

Relay 150 at the called station in operating also withdraws the carrier wave from the channel transmitting branch at that station. This has the effect of releasing relay 155 at the calling station. As a result relay 154 at the calling station is released and brings about the operation of the associated ringing relay 157 to apply the ringing generator and cause the display of lamp 16 in the calling station operator's connecting cord circuit. In withdrawing plug 9 from springjack 140 in response to this signal the calling station operator releases the associated relay 150. This relay in releasing brings about the withdrawal of the carrier wave at the calling station. It also opens at its outer left hand contact and armature the connection of conductor 101 to ground, thus restoring relays 144, 135 and 125 to normal to disconnect from the main channel conductors the branch extending to springjack 140 and to remove the busy test condition from the other branches. The opening of this same contact of relay 150 also interrupts the previously maintained energizing path for relays 151 and 143, which relays thereupon release. Relay 150 at the calling station in releasing also releases relay 156, and the release of this relay releases the associated relays 152, 163 and 170 to restore to normal the circuits that these relays control. The closure of the path to ground at the switch spring and back contact of relay 156 substitutes a ground path in parallel with that previously maintained by way of the outer left-hand armature and front contact of relay 151 and outer left-hand front contact and armature of relay 150 for the energization of relays 151 and 143. But as relay 156 is slow in releasing, this alternative path to ground is not closed until after the path by way of the contacts of relay 150 is opened for a sufficiently long interval to assure the release of relays 151 and 143. This completes the restoration to normal of the channel apparatus at the calling station. At the called station the release of relay 155, which occurs upon the withdrawal of the carrier wave at the calling station, opens the holding circuits that have been maintaining operated relays 125, 135, 145, 152, 153, 154, 157, 170, 171 and 116, thus restoring the channel to its normal condition of availability.

Figure 2:
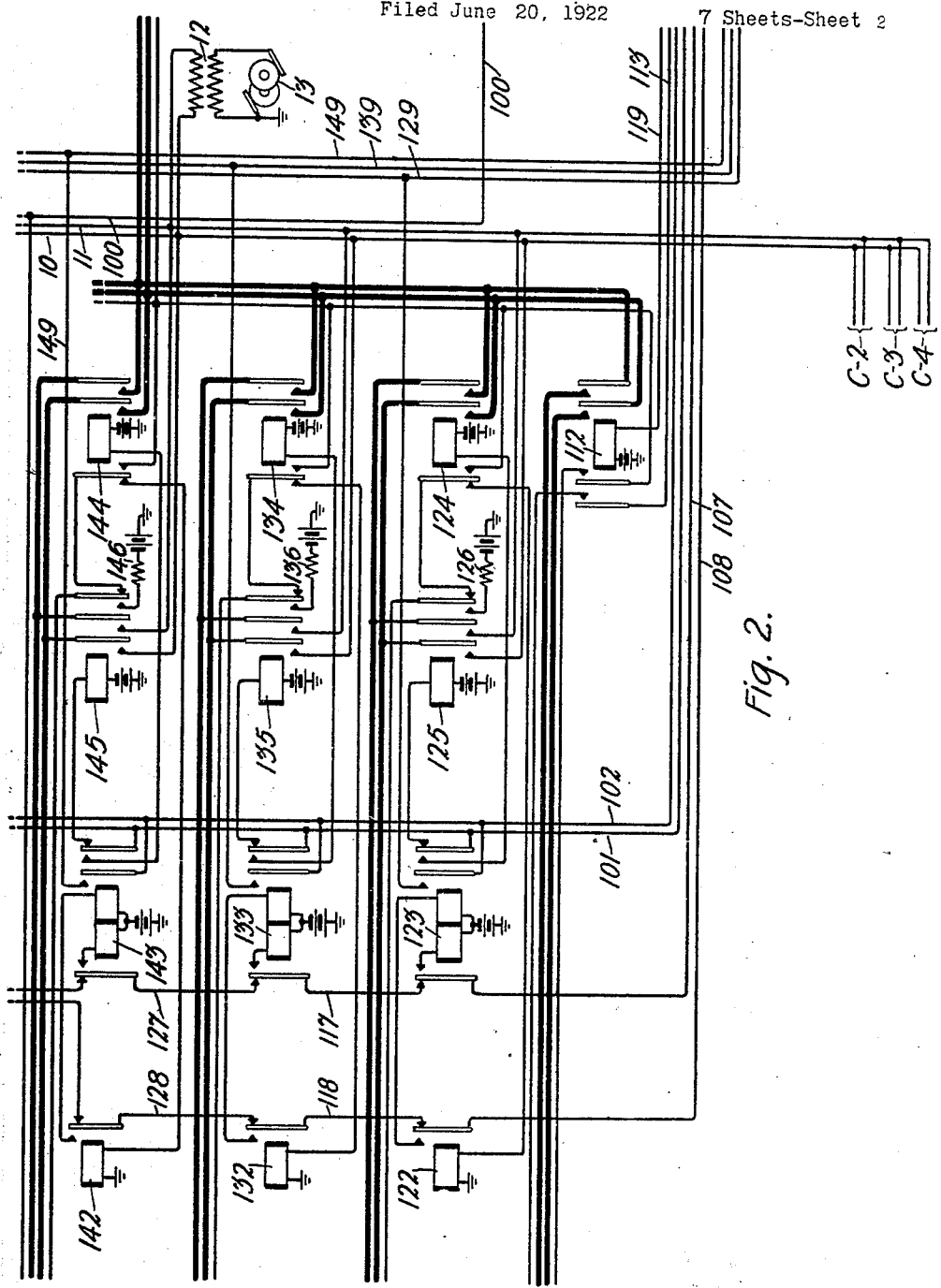
Figure 3:
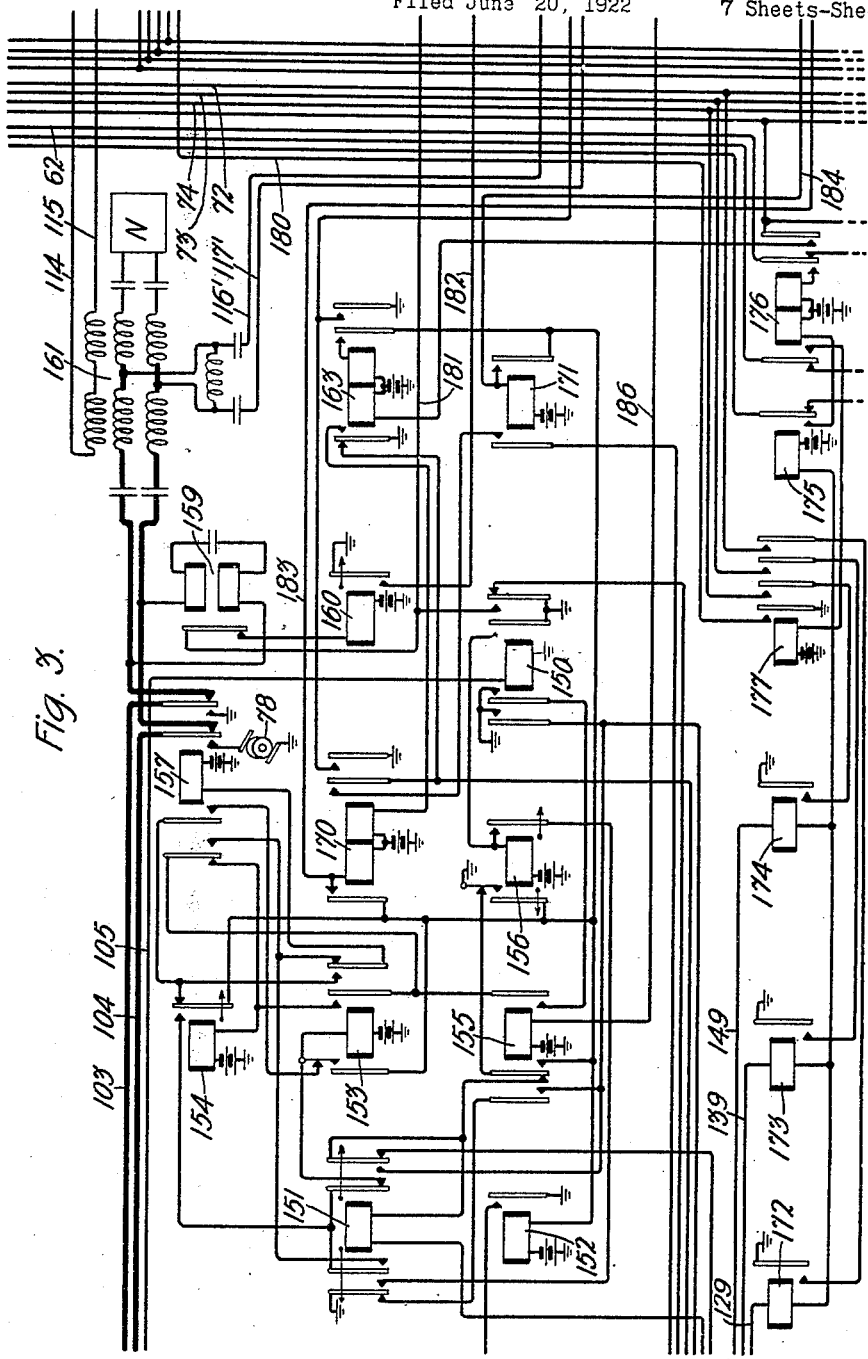
Figure 5:
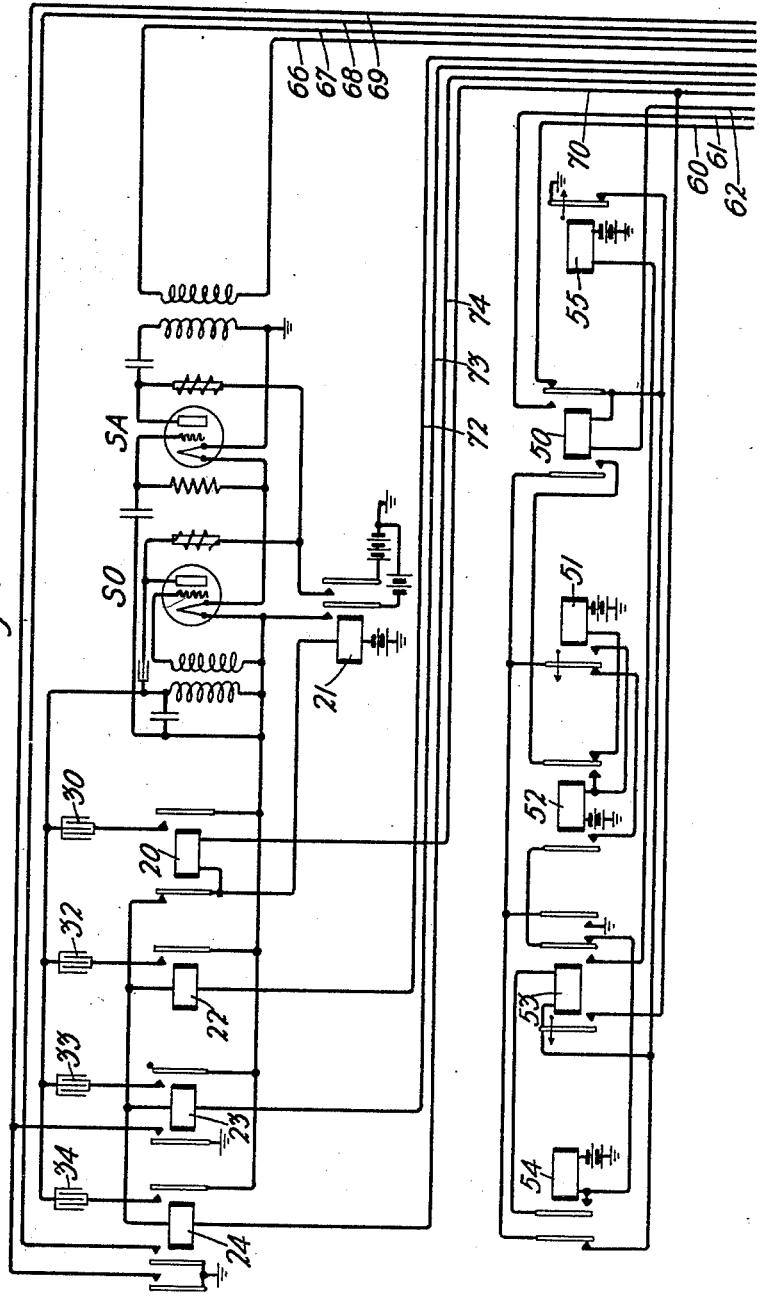
Figure 6:
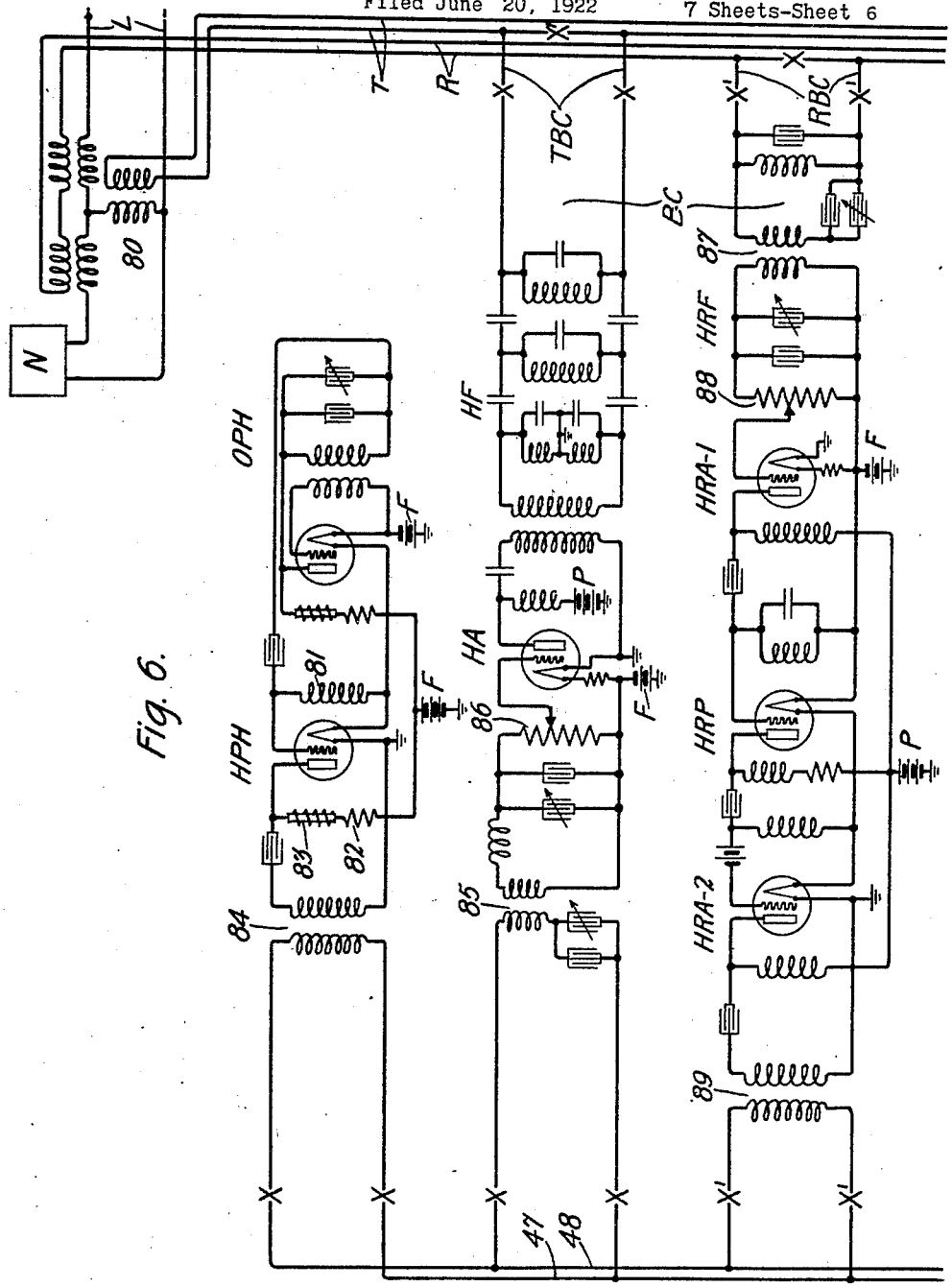

Referring to Fig. 2, it will be noted that the conductors 107, 108, 101, 102, 10, 11, 100, 129, 139, 149, 103, 104, and 105 are indicated by broken line extensions as being carried beyond the apparatus illustrated in Fig. 2. These broken line extensions are intended to indicate that, if desired, channel C—1 may be provided with branches in addition to the three that are specifically illustrated as extending to spring jacks 120, 130, 140 and their associated lamps. Such additional branches or channel extensions may terminate upon another toll operator's position, or in more than one position, in case it is desired to provide additional facilities at this toll station for using the channel; and each of such additional branches is provided with apparatus such as in the case of the channel branches that are specifically illustrated. In the same manner the other channels C—2, C—3 and C—4 may be provided with additional terminals upon other toll operators' positions. Whatever the number of branches that may be provided for each of the channels, the relationship between the branches, as has been shown and described, is such that only one of the branches may be in operative relation with a channel at a time. In like manner, referring to Fig. 3, the downward extension of conductors 60, 61, 62, 70, 72, 73, 74, 66, 67, 68 and 69 indicates that the common apparatus of Fig. 5 from and to which these conductors extend may also serve not only the channels C—2, C—3, and C—4 of the line L but also similar channels of additional carrier multiplex toll lines of the sort illustrated.

Although the present invention is disclosed herein as applied to a wired or guided carrier wave communicating system, it will be understood that it is capable of embodiment and that its advantages may be realized, in a system wherein the carrier waves are free and unguided.

What is claimed is:

1. In a carrier wave system, three or more stations arranged to communicate with each other, and a plurality of frequency selective channels each having an incoming connection terminal at each station and an outgoing connection terminal at each station for each other station adapted to be reached over said frequency selective channel.

2. In a carrier wave system, three or more stations arranged to communicate with each other, a frequency selective channel associated with said system, selective responsive apparatus for said channel at each station, a connection terminal for said channel at one of said stations for each of the other stations of the system, and means made operative in establishing connection with any of said connection terminals for operating said selective responsive apparatus at the corresponding distant station.

3. In a carrier wave communication system, three or more stations arranged to communicate with one another, a frequency selective channel associated with said system, an incoming connection terminal and selective responsive apparatus for said channel at each station, an outgoing connection terminal at one of said stations for each other station, and means made operative in establishing connection with any of said outgoing connection terminals for operating said selective responsive apparatus at the corresponding distant station.

4. In a carrier system, three or more stations arranged to communicate with one another, a frequency selective channel having responsive apparatus at each station, an outgoing connection terminal at each station for each other station to be reached over said frequency selective channel, and means automatically made operative in establishing connection with any of said outgoing connection terminals for operating the selective responsive apparatus of the corresponding distant station.

5. In a carrier wave system, three or more stations arranged to communicate with one another, a frequency selective channel associated with said system, selective responsive apparatus and an incoming connection terminal for said channel at each of two of said stations, two outgoing connection terminals at another station, and means made operative in establishing connection with either of said outgoing terminals for operating the selective responsive apparatus at a corresponding one of the two first mentioned stations.

6. In a carrier wave communicating system, a line conductor, three or more stations associated therewith, means at one of said stations for impressing a carrier wave upon said line conductor, means at said station for modulating said carrier wave alternatively with different station selecting currents and with voice currents, means at each of said other stations for responding to said voice modulations, and station selecting means at each of said other stations selectively responsive to different ones of said station selecting modulating currents.

7. In a carrier wave communicating system, three or more stations, means at each of said stations for applying a carrier wave and for responding to a carrier wave applied at another of said stations, means at each station for applying a communicating modulation to said carrier wave and responding to a communicating modulation applied to said wave at another station, and means at each station for applying a plurality of station selecting modulations to said carrier, one for each of the distant stations, and for selectively responding to a particular one of the station selecting modulations applied at the other stations.

8. In a carrier wave communicating system, a line conductor, three or more stations associated therewith, means at one of said stations for impressing a carrier wave upon said line conductor, means at said station for modulating said carrier wave alternatively with different station selecting currents and with voice currents, responsive means at each of said other stations normally selectively responsive to different ones of said station selecting modulating currents, means at each of said other stations for responding to said voice modulations, and means for rendering unresponsive said station selecting responsive means at each of said other stations.

9. In a carrier wave communicating system, a calling station and a called station, means at the calling station for transmitting a carrier wave, and for modulating said carrier wave alternatively with signaling frequencies and communicating frequencies within the same frequency range, apparatus at said called station responsive to said signaling frequencies, apparatus at said called station responsive to said communicating frequencies, and means at the called station for rendering said signaling frequency responsive apparatus unresponsive.

10. In a carrier wave communicating system, a line conductor, a calling station and a called station associated therewith, means at the calling station for impressing a carrier wave upon said line conductor and for modulating said carrier wave with communicating frequencies and with signaling frequencies within the communicating frequency range, apparatus at said called station responsive to said communicating frequency modulations, apparatus at said called station responsive to said signaling frequency modulations, and means at the called station controlled from the calling station for rendering said signaling frequency responsive apparatus unresponsive during the communicating frequency modulation of said carrier wave.

11. In a carrier wave communicating system, a line conductor, a calling station and a called station associated therewith, means at the calling station for impressing a carrier wave upon said line conductor and modulating said carrier wave with communicating frequencies and signaling frequencies within the communicating frequency range, apparatus at the called station responsive to said signaling frequency modulations, apparatus at the called station responsive to said communicating frequency modulations, and means for bringing the signaling frequency modulation responsive apparatus and the communicating frequency modulation responsive apparatus alternatively into operative relation with said line conductor at the called station.

12. In a carrier wave communicating system, a line conductor, a calling station and a called station associated therewith, means at said calling station for impressing a carrier wave upon said line conductor and for modulating said wave with communicating frequencies and with a calling frequency and a controlling frequency within said communicating frequency range, apparatuses at said called station respectively responsive to said communicating frequencies, said calling frequency and said controlling frequency, and means at said called station adapted to be operated by said controlling frequency modulation for excluding said calling and controlling frequency modulation responsive apparatus from operative relation with said line conductor.

13. In a carrier wave communicating system, a calling station and a called station, means at said calling station for transmitting a carrier wave and for modulating said carrier wave with communicating frequencies and with a calling frequency within said communicating frequency range, means at the calling station for transmitting controlling current, apparatuses at said called station respectively responsive to said communicating frequency modulation and to said calling frequency modulation, and apparatus at said called station responsive to said controlling current transmitted from the calling station for rendering said calling frequency modulation responsive apparatus unresponsive.

14. In a carrier wave communicating system, a line conductor, a calling station associated therewith, means at said calling station for impressing a carrier wave upon said line conductor and for modulating said wave with communicating frequencies and with a plurality of calling frequencies within said communicating frequency range, other stations associated with said line, apparatus at each of said stations responsive to said communicating frequency modulations, apparatus at each of said stations selectively responsive to a different one of said plurality of calling frequency modulations, means at said calling station for impressing a controlling frequency upon said line conductor, and means at each of said other stations responsive to said controlling frequency for rendering inoperative the calling frequency modulation responsive apparatus of the associated station.

15. In a carrier wave communicating system, a line conductor, a plurality of stations thereon, means at each station for transmitting a carrier wave upon said conductor and for responding to a carrier wave impressed by another of said associated stations, means at each of said stations for alternatively transmitting and receiving communicating modulations of said wave and transmitting and receiving controlling modulations of said wave within said communicating modulation frequency range, and means responsive to said controlling modulations for selecting any of said stations.

16. In a carrier wave communicating system, a plurality of stations, each of said stations being provided with communicating apparatus and with signal transmitting and receiving apparatus, a frequency selective channel having a branch at each of said stations, and means at each station for alternatively bringing the communicating apparatus and the signal transmitting and receiving apparatus of said station into operative relation with said channel.

17. In a carrier wave communicating system, two stations, a frequency selective channel adapted for use by said stations, signaling and communicating apparatus at each of said stations, and switching means at said stations controlled over said channel for bringing said signaling apparatus and communicating apparatus alternatively and dissimultaneously into operative relation with said channel.

18. In a carrier wave communicating system, two stations, a frequency selective communicating channel available for use at said stations, controlling apparatus and communicating apparatus operating within the same low frequency range at said stations and adapted for operation over said channel, and means at said stations for rendering said controlling apparatus unresponsive when said communicating apparatus is in operative relation with said channel.

19. In a carrier wave communicating system, three or more stations, means at one of said stations for transmitting a carrier wave and modulating said wave with communicating frequencies and with a plurality of differing controlling frequencies, means at each of said other stations responsive to said communicating frequency modulations, and means at each of said other stations selectively responsive respectively to different combinations of said controlling frequency modulations.

20. In a carrier wave communicating system, three or more stations, an associated frequency selective communicating channel for the communicating interconnection of said stations, means at one of said stations for impressing a plurality of differing combinations of low frequency controlling currents on the carrier wave of said channel, and means at each of the distant stations selectively responsive to a different one of said differing combinations of low frequency controlling currents.

21. In a carrier wave communicating system, a line conductor, three or more stations associated therewith, means at each station for transmitting and receiving a carrier wave over said conductor, means at each station for modulating the transmitted carrier wave with communicating frequencies and for responding to communicating modulations received over the carrier wave transmitted from another station, means at each station for modulating the carrier wave with a plurality of differing controlling frequencies, and means at each station for selectively responding to combinations of said controlling modulations differing from the combinations of controlling modulations to which the other stations are responsive.

22. In a carrier wave communicating system, three or more stations associated with one another and provided with communicating apparatus, a plurality of frequency selective communicating channels associated with said station and adapted for use by the communicating apparatus of said stations, common station selecting apparatus at one of said stations adapted to be set to select any desired one of the distant stations, means for temporarily associating said station selecting apparatus with any one of said channels to operate thereover, and responsive apparatus associated with each of the channels at each of the other stations where the channel is available for use adapted to respond selectively to a corresponding setting of said station selecting apparatus of said first mentioned station.

23. In a carrier wave communicating system, a line conductor, a plurality of frequency selective communicating channels, two stations adapted for interconnection over any of said channels, call responsive apparatus normally in operative relation with each of said channels at one of said stations, calling apparatus at the other station common to said channels for generating waves adapted to operate said call responsive apparatus at the distant station, and switching mechanism for bringing said calling apparatus temporarily and exclusively into operative relation with one or another of said channels.

24. In a carrier wave communicating system, a calling station, other stations, a plurality of frequency selective communicating channels through the medium of which said calling station is adapted to establish communication with said other stations, means at said calling station for impressing upon the carrier wave of any of said channels a plurality of low frequency calling waves to which distant stations are selectively responsive, and switching mechanism at said calling station for temporarily appropriating said calling wave producing means for the exclusive use of any one of said channels.

25. In a carrier wave communicating system having three or more stations, a line conductor and a plurality of associated frequency selective channels for the communicating interconnection of said stations, means at one of said stations common to said channels for impressing a plurality of differing low frequency controlling currents on the carrier waves of said channels, means at each of the distant stations selectively responsive to a different one of said low frequency controlling currents, and means for temporarily appropriating said controlling current impressing means for the exclusive use of one of said channels.

26. In a carrier wave communicating system having three or more stations, a plurality of associated frequency selective channels for the communicating interconnection of said stations, means at one of said stations common to said channels for impressing a plurality of differing combinations of low frequency calling currents on the carrier waves of said channels, and means at each of the distant stations selectively responsive to a different one of said differing combinations of low frequency calling currents.

27. In a carrier wave communicating system having three or more stations, a plurality of associated frequency selective channels for the communicating interconnection of said stations, means at one of said stations common to said channels for impressing a plurality of differing combinations of low frequency calling currents on the carrier waves of said channels, means at each of the distant stations selectively responsive to said differing combinations of low frequency calling currents, means for temporarily appropriating said calling current impressing means for the exclusive use of one of said channels, and means at said calling station for automatically limiting the time during which said low frequency calling currents are impressed upon said channels.

28. In a carrier wave communicating system, a line conductor, a calling station and a called station associated therewith, a frequency selective channel associated with said line conductor and having a connection terminal at each of said stations, means at each station for establishing connection with said channel by way of the associated connection terminal, means operating and operated over said channel for producing a temporary application of signaling current by way of the connection terminal talking conductors at one station when connection is made with the connection terminal at the other station, and means operating and operated over said channel for causing a continuing application of signaling current by way of the connection terminal talking conductors of the first mentioned station upon disconnection of the connecting means from the connection terminal at the other station.

29. In a carrier wave communicating system, a line conductor, a calling station and a called station associated therewith, means at each station for transmitting and for receiving from the other station a communicating carrier wave and for impressing voice current modulations upon the transmitted wave, signaling means at each station comprising means for withdrawing said carrier wave and for responding to the withdrawal of the carrier wave at the other station, other stations associated with said line conductor, and busy indicating means at each station actuated by the presence on said line conductor of the carrier wave transmitted by either the calling or called station, whereby the busy indication at said other station is maintained by the transmitted carrier wave of either of the first mentioned two stations when the other station withdraws its carrier wave to signal.

30. In a carrier wave communicating system, a calling station and a called station, means at each of said stations for transmitting and for receiving from the other station a communicating carrier wave and for modulating the transmitted carrier wave with voice frequencies, means at each station for temporarily withdrawing said wave for signaling purposes, other stations, and apparatus at each of said other stations responsive to the withdrawal of the carrier wave by both the calling station and the called station, but unresponsive to the withdrawal of the carrier wave by either station alone.

31. In a carrier wave communicating system, a plurality of stations, a frequency selective channel accessible by each of said stations for communicating purposes, a plurality of branches of said channel at one of said stations, a terminal for each branch, a manual switch for connecting with said terminals, and means actuated by the connection of said switch with a terminal for rendering the other branches busy.

32. In a carrier wave communicating system, a plurality of stations, a frequency selective channel having a plurality of branches at one of said stations and other branches at other of said stations, a terminal for each branch, a manual switch for connecting with said terminals, and means actuated by the connection of said switch with a terminal for rendering the other branches busy.

33. In a carrier current signaling system, a line having three or more stations, a plurality of carrier current channels superposed on said line and having terminals in said stations, jacks at each station for each channel corresponding to other stations to be communicated with, cord circuit plugs, and means acting automatically upon insertion of a plug into a jack for selectively calling the station corresponding to said jack over the corresponding carrier current channel and for locking the stations to which the seized channel has access, except the calling and the called stations, against making connection with the seized channel.

34. In a carrier current signaling system, a line having three or more stations, a plurality of carrier current channels superposed on said line and having terminals in said stations, jacks for each channel at a station, said jacks corresponding to other stations to be communicated with, connecting plugs, means acting automatically in response to the insertion of a plug into a jack for momentarily applying to a channel a wave of a particular calling frequency dependent upon the jack used, and means responsive to said wave at one only of the other stations for giving a calling signal.

35. In a carrier current telephone system, a line having three or more carrier current stations, ordinary telephone stations associated therewith, a plurality of carrier current channels superposed on said line and having terminals at said carrier current stations, said terminals comprising high frequency wave controlling circuits and voice frequency interconnecting circuits for establishing a communicating relation between a said channel and a said ordinary telephone station, said interconnecting circuits being normally disconnected from both said ordinary telephone stations and said wave controlling circuits, and means acting automatically in response to the connecting of an ordinary telephone station to an interconnecting circuit at an initiating station for operatively associating the so connected interconnecting circuit with the carrier wave controlling circuit of a channel to be used and for locking all other interconnecting circuits associated with the appropriated channel at all the stations against access to the appropriated channel except at a particular station corresponding to the particular interconnecting circuit with which connection is made at the initiating station.

In witness whereof, I hereunto subscribe my name this 19th day of June A. D., 1922.

SAMUEL B. WILLIAMS, Jr.